(12) United States Patent
Okawa et al.

(10) Patent No.: US 10,795,115 B2
(45) Date of Patent: Oct. 6, 2020

(54) SHOOTING APPARATUS AND FOCUSING METHOD

(71) Applicant: Olympus Corporation, Hachioji-shi, Tokyo (JP)

(72) Inventors: Satoshi Okawa, Hachioji (JP); Takeshi Kindaichi, Hachioji (JP); Naoaki Tani, Hachioji (JP)

(73) Assignee: Olympus Corporation, Tokyo (JP)

( * ) Notice: Subject to any disclaimer, the term of this patent is extended or adjusted under 35 U.S.C. 154(b) by 115 days.

(21) Appl. No.: 15/807,557

(22) Filed: Nov. 8, 2017

(65) Prior Publication Data

US 2018/0129014 A1 May 10, 2018

(30) Foreign Application Priority Data

Nov. 10, 2016 (JP) ................. 2016-219598

(51) Int. Cl.
*G02B 7/02* (2006.01)
*G02B 7/10* (2006.01)
*G03B 13/32* (2006.01)
*G03B 3/10* (2006.01)

(52) U.S. Cl.
CPC ............... *G02B 7/102* (2013.01); *G03B 3/10* (2013.01); *G03B 13/32* (2013.01)

(58) Field of Classification Search
CPC ........................................... G02B 7/102
USPC ........................................... 359/824
See application file for complete search history.

(56) References Cited

U.S. PATENT DOCUMENTS 9,823,546 B2* 11/2017 Okawa ............... G03B 13/34
2016/0116824 A1* 4/2016 Okawa ............... G03B 13/34
396/81

* cited by examiner

*Primary Examiner* — James C. Jones
(74) *Attorney, Agent, or Firm* — John C. Pokotylo; Pokotylo Patent Services

(57) ABSTRACT

A shooting apparatus comprising: a focusing lens provided within a lens barrel including a shooting lens, the focusing lens being movable in an optical axis direction; a ring disposed so as to be rotatable with respect to the lens barrel; a rotation detector configured to detect a rotation amount and rotation direction of the ring; a controller configured to calculate, based on the rotation amount detected by the rotation detector, a moving speed of the focusing lens to control a movement of the focusing lens at the calculated moving speed in a predetermined cycle period and in accordance with the rotation direction.

9 Claims, 14 Drawing Sheets

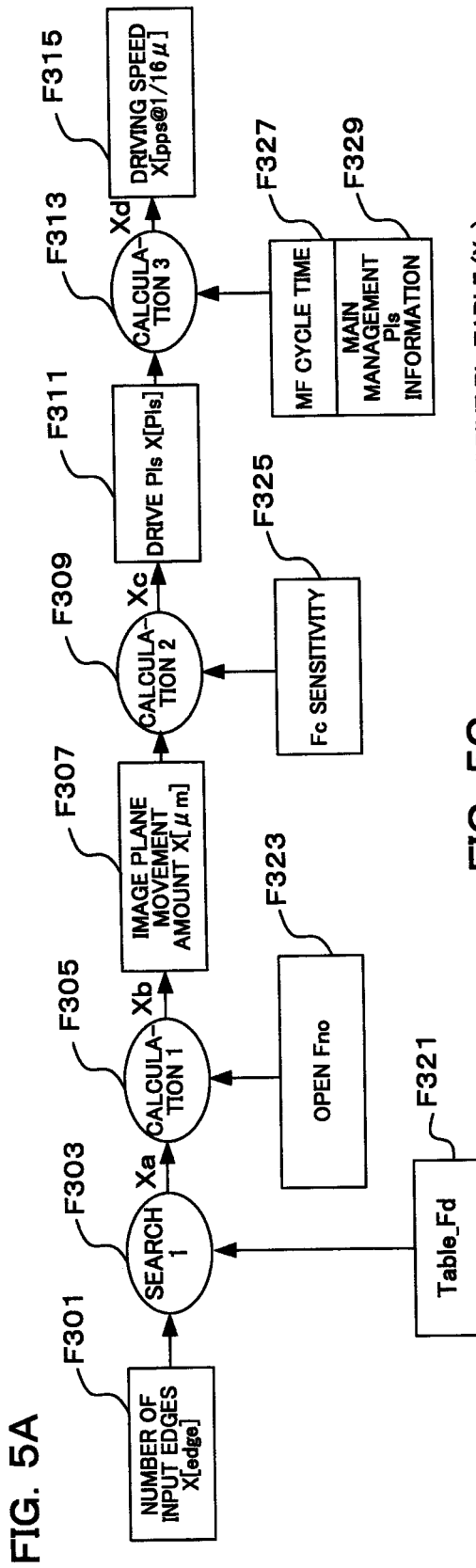

AREA DIVISION THRESHOLD EDGE TABLE

| | THRESHOLD | EDGE | COEFFICIENT |
|---|---|---|---|
| | 1 | 7 | 0.6 |
| | 2 | 9 | 0.7 |
| | 3 | 11 | 0.8 |
| AREA | 4 | 13 | 0.9 |
| | 5 | 15 | 1 |
| | 6 | 17 | 1 |
| | 7 | 20 | 1 |

FIG. 7A  MaxPls OF FINE-ADJUSTMENT DRIVE Pls

| ZMENC | ZM0 | ZM1 | ZM2 | ... | ZM31 | ZM32 |
|---|---|---|---|---|---|---|
| DRIVE Pls | f0 | f1 | f3 | ... | f31 | f32 |

FIG. 7B  MaxPls OF COARSE-ADJUSTMENT DRIVE Pls

| ZMENC | ZM0 | ZM1 | ZM2 | ... | ZM31 | ZM32 |
|---|---|---|---|---|---|---|
| DRIVE Pls | g0 | g1 | g3 | ... | g31 | g32 |

FIG. 9A

| EDGE | ZM0 | ZM1 | ZM2 | ZMENC ... | ZM30 | ZM31 |
|---|---|---|---|---|---|---|
| 1 | P(1:0) | P(1:1) | P(1:2) | ... | P(1:30) | P(1:31) |
| 2 | P(2:0) | P(2:1) | P(2:2) | ... | P(2:30) | P(2:31) |
| 3 | P(3:0) | P(3:1) | P(3:2) | ... | P(3:30) | P(3:31) |
| ... | ... | ... | ... | ... | ... | ... |
| 19 | P(19:0) | P(19:1) | P(19:2) | ... | P(19:30) | P(19:31) |
| 20 | P(20:0) | P(20:1) | P(20:2) | ... | P(20:30) | P(20:31) |

FIG. 9B

| EDGE | ZM0 | ZM1 | ZM2 | ZMENC ... | ZM30 | ZM31 |
|---|---|---|---|---|---|---|
| 1 | Vol(1:0) | Vol(1:1) | Vol(1:2) | ... | Vol(1:30) | Vol(1:31) |
| 2 | Vol(2:0) | Vol(2:1) | Vol(2:2) | ... | Vol(2:30) | Vol(2:31) |
| 3 | Vol(3:0) | Vol(3:1) | Vol(3:2) | ... | Vol(3:30) | Vol(3:31) |
| ... | ... | ... | ... | ... | ... | ... |
| 19 | Vol(19:0) | Vol(19:1) | Vol(19:2) | ... | Vol(19:30) | Vol(19:31) |
| 20 | Vol(20:0) | Vol(20:1) | Vol(20:2) | ... | Vol(20:30) | Vol(20:31) |

SHOOTING APPARATUS AND FOCUSING METHOD

CROSS-REFERENCE TO RELATED APPLICATIONS

Benefit is claimed, under 35 U.S.C. § 119, to the filing date of prior Japanese Patent Application No. 2016-219598 filed on Nov. 10, 2016. This application is expressly incorporated herein by reference. The scope of the present invention is not limited to any requirements of the specific embodiments described in the application.

BACKGROUND OF THE INVENTION

1. Field of the Invention

The present invention relates to a shooting apparatus with an operation member for manually adjusting a shooting lens and to a focusing method.

2. Description of Related Art

There is generally known a shooting apparatus in which a shooting lens is provided with a range ring in a ring shape and this range ring is rotationally operated manually to allow manual focusing. In such a shooting apparatus, a focusing lens is moved in accordance with the rotation speed of the range ring. The focusing operation performed by a user includes coarse adjustment and fine adjustment. In the shooting apparatus disclosed in Japanese Laid-Open Patent Publication No. 2016-085272 (hereinafter referred to as "Patent Literature 1"), improvement of an operational feeling in the coarse adjustment and in the fine adjustment is attempted. Note that, the coarse adjustment is an operation when a user wishes to quickly perform focusing, and is the focusing in which a rough focusing position is searched by rotationally operating the range ring quickly. Moreover, the fine adjustment is the operation when a user wishes to finely perform focusing, and is the focusing in which a correct focusing position is searched by rotationally operating the range ring slowly.

The coarse adjustment in the shooting apparatus disclosed in Patent Literature 1 is as follows. When the shooting lens is a zoom lens, the number of drive pulses (Pls) for driving the focusing (FCS) lens from a point at infinity to a closest distance differs depending on a zoom state. Usually, the shorter the focusing length, the fewer becomes the number of drive pulses (hereinafter, referred to as "stroke pulses") required for the zoom lens to move from a point at infinity to a closest distance, and as the focusing length becomes long, the number of stroke pulses will increase. For example, the number of stroke pulses differs depending on a mirror frame, and is 2,000 Pls for a wide end and 20,000 Pls for a telephoto end, so there is a difference close to a ten-times difference in the number of drive pulses (in the number of Pls).

Then, in the case of the coarse adjustment, the control is made so as to obtain an identical change in a subject distance if the operation time of the range ring (MF ring) is the same. For example, when the MF ring is moved by 120 degrees (120 Deg) at a certain operation speed, the focusing (FCS) lens is driven from a point at infinity to a closest distance regardless of the focusing length (and the associated change in the number of stroke pulses). That is, the control is made so that a ratio between the rotation speed of the range ring and the number of drive pulses (Pls) for driving the focusing lens becomes 1:1.

Moreover, the fine adjustment in the shooting apparatus disclosed in Patent Literature 1 is as follows. Due to the specification (design) of the mirror frame, Fno (related to the permissible depth) and Fc sensitivity (focus sensitivity) change depending on a zoom state and the number of Pls corresponding to the permissible depth (focusing range) differs. In performing the fine adjustment, the movement of the focusing lens is controlled so that the image plane movement amount per one edge of a detection pulse generated in accordance with the movement of the range ring becomes constant.

Moreover, in the shooting apparatus disclosed in Patent Literature 1, FcsPls for driving the focusing lens (number of pulses (Pls) for driving the focusing lens) is calculated from the operation speed of the range ring. Then, in the next cycle processing time of a cycle, in which the operation speed of the range ring has been detected, the focusing lens is driven with the calculated FcsPls. Pls which did not reach a target number of drive pulses within the cycle processing time is carried over, and is added for a target position in driving the focusing lens in the further next cycle processing time.

In the shooting apparatus disclosed in Patent Literature 1, the fine adjustment and the coarse adjustment are separately controlled. Therefore, switching between the fine-adjustment drive and the coarse-adjustment drive is not smooth, and thus an abrupt change in the movement amount (speed) occurs in a vicinity of the switching between the fine-adjustment drive and the coarse-adjustment drive, and a user who manually operates the range ring may feel an abrupt change in an observed live view image.

As previously described, Pls which did not reach a target number of drive pulses is carried over. This is because in the conventional coarse-adjustment drive, Fcs control is performed so that a ratio between the rotation speed of the range ring and the number of drive pulses (Pls) for driving the focusing lens becomes 1:1 assuming that the range ring is operated by 120 degrees at a constant speed. However, actually, the operation speed of the range ring operated by a user is not constant. Therefore, carry-over of the driving Pls occurs depending on the past operation state. Once carry-over of the driving Pls occurs, then a targeted operational feeling may not be obtained with respect to a change of the user operation.

SUMMARY OF THE INVENTION

The present invention provides a shooting apparatus and focusing method capable of controlling a coarse-adjustment drive and fine-adjustment drive to smoothly switch over, responding to a change in a user operation, and providing a targeted operational feeling.

A shooting apparatus according to a first aspect of the present invention comprises: a focusing lens provided within a lens barrel including a shooting lens, the focusing lens being movable in an optical axis direction; a ring disposed so as to be rotatable with respect to the lens barrel; a rotation detector configured to detect a rotation amount and rotation direction of the ring; and a controller configured to calculate, based on the rotation amount detected by the rotation detector, a moving speed of the focusing lens to control a movement of the focusing lens at the moving speed calculated in a predetermined cycle period and in accordance with the rotation direction.

A shooting apparatus according to a second aspect of the present invention comprises: a focusing lens provided within a lens barrel including a shooting lens, the focusing lens being movable in an optical axis direction; a ring disposed so as to be rotatable with respect to the lens barrel; a rotation detector configured to detect a rotation amount and rotation direction of the ring; a memory for storing a first relationship between a movement amount of the focusing lens and an image plane movement amount and a second relationship between a rotation speed of the ring and a movement amount of the focusing lens; a controller configured to set a movement amount of the focusing lens resulting in a predetermined image plane movement amount with respect to a unit rotation amount of the ring based on the first relationship, control a movement of the focusing lens in accordance with a rotation amount and rotation direction of the ring based on the movement amount, set a movement amount with respect to a rotation speed of the ring based on the second relationship, and control a movement of the focusing lens in accordance with a rotation amount and rotation direction of the ring based on the movement amount; and a rotation speed detector configured to detect a rotation speed of the ring, wherein the controller sets a movement amount of the focusing lens resulting in a predetermined image plane movement amount with respect to the unit rotation amount of the ring based on the first relationship, when the rotation speed detected by the rotation speed detector is smaller than a predetermined value, sets a movement amount with respect to the rotation speed of the ring based on the second relationship, when the rotation speed is larger than the predetermined value, and sets, when the rotation speed is the predetermined value, a movement amount based on a maximum value of the movement amount when the rotation speed is smaller than the predetermined value and a maximum value of the movement amount when the rotation speed is larger than a predetermined value.

A shooting method according to a third aspect of the present invention is a focusing method in a shooting apparatus including: a focusing lens provided within a lens barrel including a shooting lens, the focusing lens being movable in an optical axis direction; and a ring disposed so as to be rotatable with respect to the lens barrel, the shooting method comprising: detecting a rotation amount and rotation direction of the ring; calculating a moving speed of the focusing lens based on the detected rotation amount; and controlling a movement of the focusing lens in accordance with the rotation direction at the moving speed calculated in a predetermined cycle period.

BRIEF DESCRIPTION OF THE DRAWINGS

FIG. 5A to FIG. 5D are the block diagram and associated tables illustrating calculation processing in fine-adjustment drive in the camera according to an embodiment of the present invention.

FIG. 7A and FIG. 7B are the tables illustrating the maximum Pls (MaxPls) of a fine-adjustment drive Pls and the maximum Pls (MaxPls) of a coarse-adjustment drive Pls in the camera according to an embodiment of the present invention.

FIG. 9A and FIG. 9B are the tables each illustrating a relationship between a driving Pls and the number of input edges (or driving speed) at each focusing length (zoom position) in the camera according to an embodiment of the present invention.

DETAILED DESCRIPTION OF THE PREFERRED EMBODIMENTS

Figure 1:
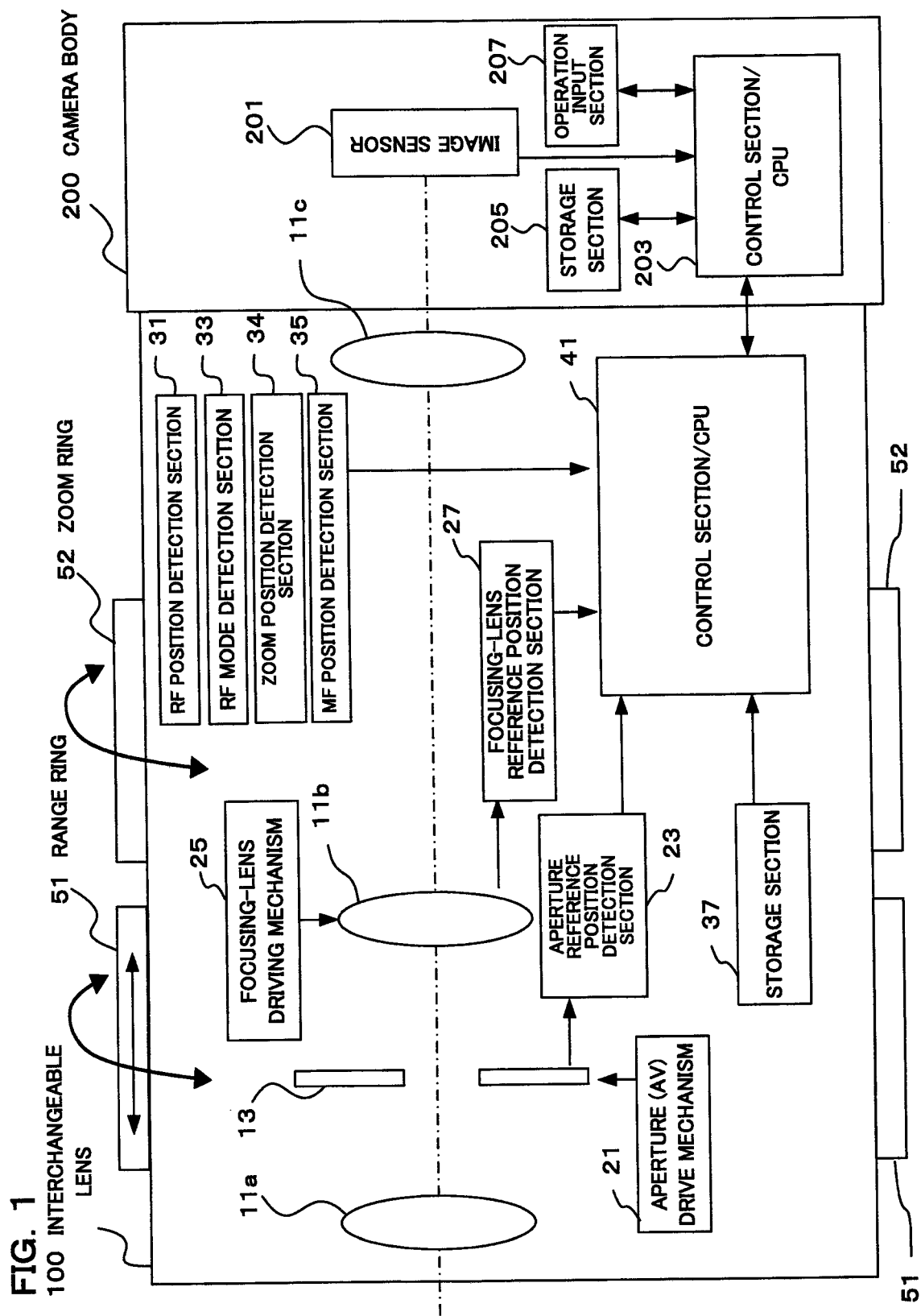
FIG. 1 is a block diagram illustrating a configuration of a camera according to an embodiment of the present invention.
Figure 2:
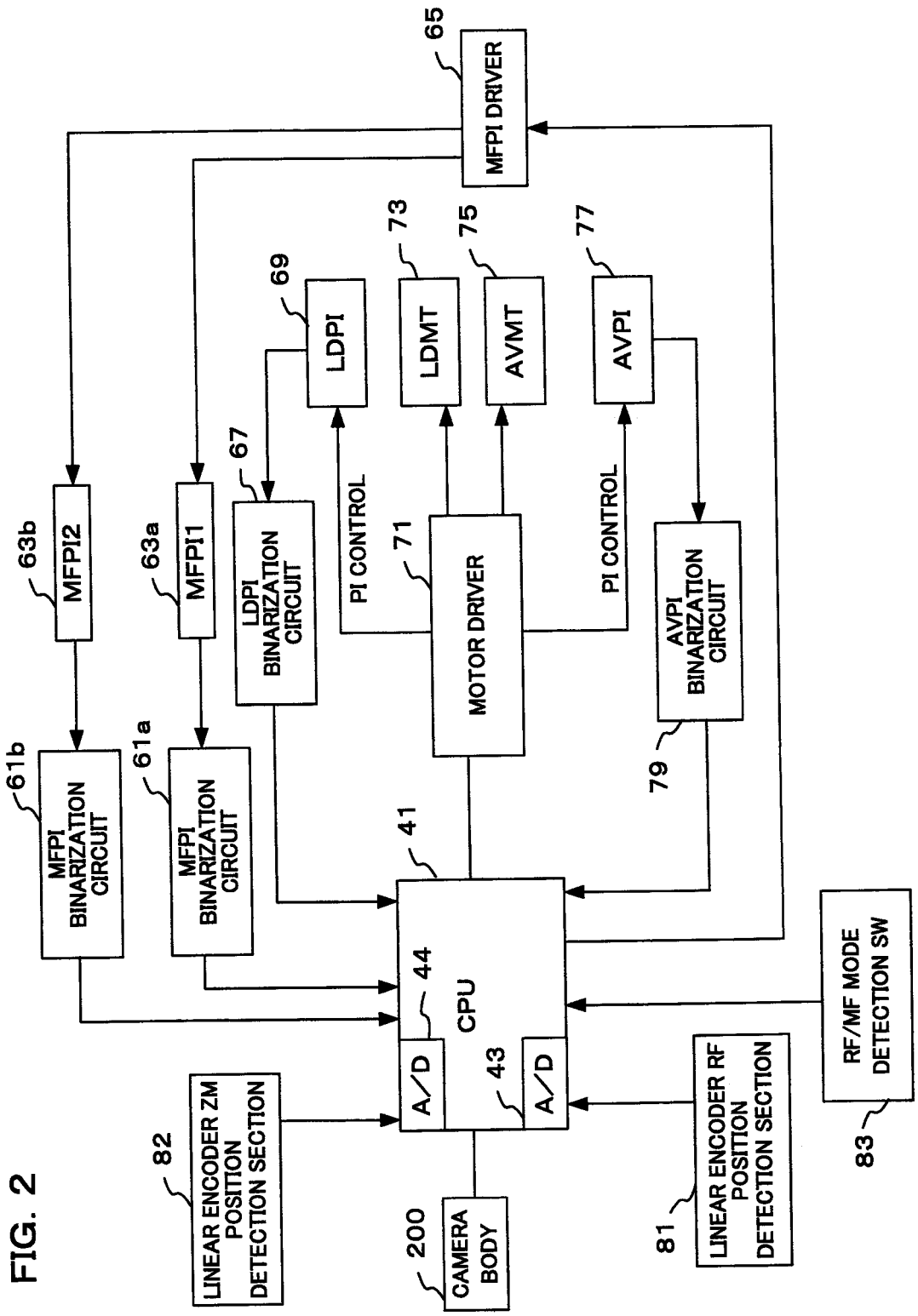
FIG. 2 is a block diagram mainly illustrating an electric configuration of the camera according to an embodiment of the present invention.

Hereinafter, a preferred embodiment will be explained using a camera, to which the present invention is applied, in accordance with the drawings. FIG. 1 is a block diagram illustrating the configuration of a camera according to an embodiment of the present invention, while FIG. 2 is a block diagram illustrating the electric configuration in this camera. This camera includes an interchangeable lens 100 and a camera body 200. However, certainly, a lens barrel and the camera body may be integrally formed.

Inside the interchangeable lens 100, a shooting lens 11 including lenses 11a to 11c is provided. A subject image is formed by the shooting lens 11. Among these lenses, the focusing lens 11b is for focusing, and is movable in an optical axis direction by a focusing-lens driving mechanism 25. The focusing-lens driving mechanism 25 includes a focusing-lens actuator and a focusing-lens drive circuit. Moreover, some of the lenses 11a to 11c are zoom lenses for changing the focusing length. Accordingly, a group of zoom lenses is provided inside the interchangeable lens 100. The focusing lens 11b corresponds to a focusing lens movable in the optical axis direction, the focusing lens being provided inside the lens barrel including the shooting lens.

Moreover, once the focusing lens 11b reaches a reference position, a focusing-lens reference position detection section 27 outputs a detection signal to a CPU 41 which is a control section. The focusing-lens position detection section 27 includes a focusing-lens reference position detection sensor and a signal processing circuit which processes a signal from this sensor and outputs a detection signal. As the reference position detection sensor, a photo interrupter (PI) is used in this embodiment, but a sensor other than this sensor may detect the reference position. Note that, in this embodiment, once the reference position is detected, then with this position as a reference, the position of the focusing lens 11b is detected based on the number of pulses (number of Pls) applied to the focusing-lens actuator (using a stepping motor).

An aperture 13 is arranged between the lenses 11a and 11b. The opening diameter of the aperture 13 is changed by an aperture driving mechanism 21 so as to change the amount of subject light that passes through the shooting lens 11. The aperture driving mechanism 21 includes an aperture actuator, an aperture drive circuit, and the like. The actuator uses a stepping motor to perform fine control by micro-step driving. Note that the aperture 13 may certainly be arranged at a position other than between the lenses 11a and 11b.

An aperture reference position detection section 23 outputs a detection signal to the CPU 41 when the opening diameter of the aperture reaches a reference position. The aperture reference position detection section 23 includes an aperture reference position detection sensor and a signal processing circuit which processes a signal from this sensor and outputs a detection signal. The reference position detection section 23 obtains a reference position for the aperture position and manages the aperture position by detecting a relative position with respect to this reference position. The relative position is detected using the number of pulses applied to the stepping motor, while the reference position is detected, in this embodiment, by the photo interrupter (PI).

A range ring 51 in a ring shape is arranged in the outer circumference of the interchangeable lens 100. The range ring 51 is turnable in the outer circumference of the interchangeable lens 100 and also slidable within a predetermined range in the optical axis direction of the shooting lens 11. If this range ring 51 is slid to a subject side, it is set to a non-RF (a non-range focus or may be referred to as an MF (manual focus)) position, while if this range ring 51 is slid to the body side, it is set to an RF (range focus) position. The RF mode and non-RF mode (MF mode) are switched by the slide of the range ring 51. This mode is detected by an RF mode detection section 33. Moreover, the range ring 51 is configured so as to be turnable between a point at infinity and a closest distance. The range ring 51 functions as a ring which is arranged so as to be rotatable with respect to the lens barrel.

The non-RF mode is a mode in which a user performs focusing in accordance with the rotation direction and rotation amount of the range ring 51, while the RF mode is a mode in which a user focuses on a distance specified by the range ring 51. That is, both the non-RF mode and the RF mode are for the manual focus, but differ in that the range ring 51 specifies a relative distance in the non-RF mode while in the RF mode it specifies an absolute distance.

Once the MF mode is set by the slide of the range ring 51, then by rotation of the range ring 51, a comb-shaped light shielding blade inside the range ring 51 is rotated integrally with the range ring 51. This rotation of the light shielding blade is counted by the photo interrupter (PI), and the focusing lens 11b is driven in accordance with this count value. Note that the rotation direction and rotation amount of the range ring 51 may certainly be detected by a sensor other than the photo interrupter.

Once the RF mode is set by the slide of the range ring 51 and the range ring 51 is rotated, the rotation position thereof is detected by an RF position detection section 31. The RF position detection section 31 includes an encoder and detects the absolute position of the rotation position of the range ring 51. The focusing-lens driving mechanism 25 drives the focusing lens 11b to a shooting distance corresponding to the rotation position of the range ring 51, in accordance with a control signal from the CPU 41. This lens drive is performed by a focusing-lens driving motor (LDMT 73) described later.

The RF mode detection section 33 detects which of the non-RF position (MF position) and the RF position the range ring 51 is currently being set to, based on an output of an RF/MF mode detection switch 83 (see FIG. 2).

An MF position detection section 35 includes a detection circuit configured to detect the rotation amount and rotation direction of the ring member, and detects the rotation direction and rotation amount of the range ring 51 when the range ring 51 is being set to the non-RF position (MF position). The manual focusing is performed based on the detection result of this MF position detection section 35. The MF position detection section 35 includes MFPIs 63a, 63b, MFPI binarization circuits 61a, 61b, and the like described later.

The MF position detection section 35 functions as a rotation detector for detecting the rotation amount and rotation direction of the ring member. This rotation detector detects the rotation amount and rotation direction of the ring member for each cycle (e.g., see cycles t1 to t8 of FIG. 4, and #1 of FIG. 12). Moreover, a pulse signal which is output in accordance with the rotation of the range ring 51 detected by the MF position detection section 35 is counted for a predetermined time period to detect the rotation speed (e.g., see F301 of FIG. 5A, F331 of FIG. 6A, S27 of FIG. 11, and #1 of FIG. 12). These configurations function as a rotation speed detector for detecting the rotation speed of the ring member. Note that, as the detection section of the rotation amount and rotation direction of the ring member, an example using a photo interrupter has been explained. However, not limited thereto, and another sensor, such as a photo reflector or a magnetic sensor, may be certainly used.

A zoom ring 52 is arranged in the outer circumference of the interchangeable lens 100 and on the body side from the range ring 51 so as to be turnable in the outer circumference of the interchangeable lens 100. The shooting lens is a zoom lens having a variable focusing length, and can zoom when a user manually rotates the zoom ring 52. The zoom ring 52 functions as a focusing length setting unit. The zooming operation may be electromotively performed, but in this embodiment the zoom lens is driven directly via a mechanical mechanism by a manual operation.

A zoom position detection section 34 includes a position detection sensor configured to detect the absolute value of the rotational position of the zoom ring 52 and output the same to the CPU 41. The zoom position detection section 34 includes a linear encoder ZM position detection section 82 as described later. The output of this linear encoder position detection section 82 is A/D-converted by an A/D converter 44 inside the CPU 41, and this AD-converted value represents a focusing length. The zoom position detection section 34 functions as a zoom position detector configured to detect a zoom position of a group of zoom lenses.

A storage section 37 includes a memory, such as a rewritable nonvolatile memory such as a flash memory, and stores programs for the CPU 41, various information such as optical data of the interchangeable lens, various adjustment values, and various parameters etc.

Further, the storage section 37 stores a Table_Fd table, an open Fno table, and an Fc sensitivity table, which will be described later using FIG. 5A and FIG. 5B. The Table_Fd table stores an image plane movement amount corresponding to the number of input edges X. The open Fno table stores the open aperture value for each focusing length. The Fc sensitivity table stores the Fc sensitivity corresponding to a current focusing length. Moreover, the storage section 37 also stores an MF cycle time and main management Pls information (described later). The MF cycle time is the time period during which the CPU 41 detects a lens state and the like for each predetermined time period and updates data (e.g., see cycles t1 to t8 of FIG. 4). Moreover, the storage section 37 also stores a fine-adjustment drive Pls table and fine adjustment speed table which are later described using FIG. 5C and FIG. 5D.

Moreover, the storage section 37 stores an Edg_div_thresh table and Table_Edg_div table which are later described using FIG. 6A. The Edg_div_thresh table stores a threshold (threshold of the number of edges) for dividing an area in accordance with a number of input edges X and a threshold coefficient (described later) corresponding to a division area divided by this threshold. The Table_Edg_div table stores the number of coarse-adjustment driving Pls corresponding to the focusing length (ZMENC described later) for each division area.

The storage section 37 functions as a memory for storing a first relationship between the movement amount of the focusing lens and an image plane movement amount and a second relationship between the rotation speed of the ring member and the movement amount of the focusing lens (e.g., see FIG. 9A and FIG. 9B).

The CPU 41 which is a control section is a controller configured to control the inside of the interchangeable lens 100 in accordance with a control instruction from the camera body 200 and according to a program stored in the previously-described storage section 37. The CPU 41 receives detection signals from the aperture reference position detection section 23, the focusing-lens reference position detection section 27, the RF position detection section 31, the RF mode detection section 33, and the MF position detection section 35, and outputs a control signal to the focusing-lens driving mechanism 25 and the aperture driving mechanism 21.

Figures 6A, 6B:
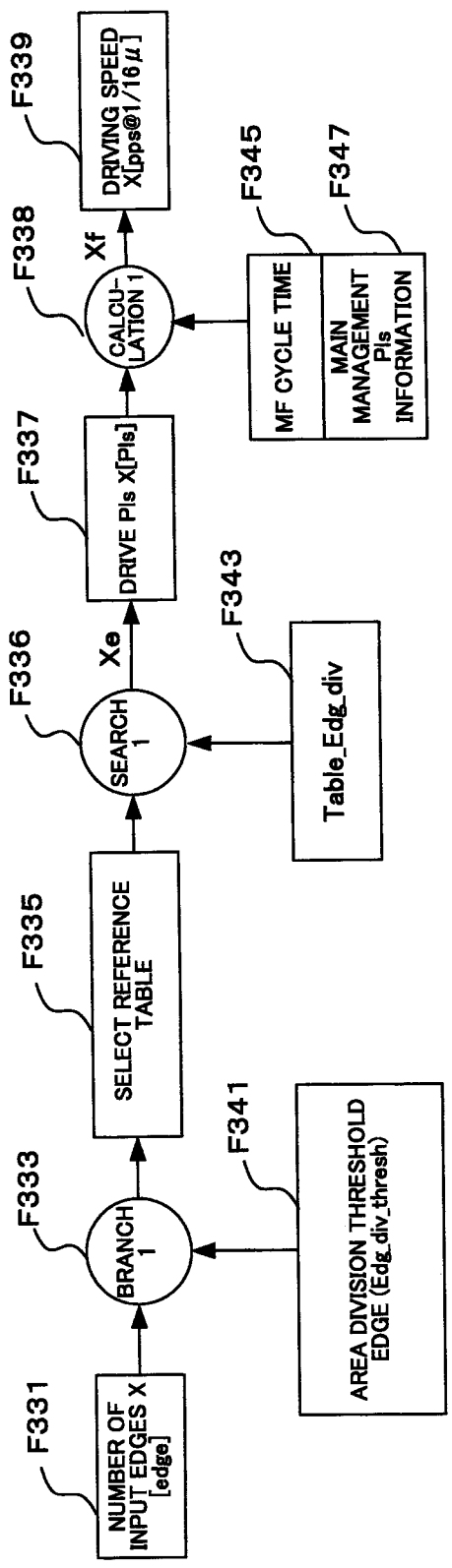
FIG. 6A and FIG. 6B are the block diagram and associated table illustrating calculation processing in coarse-adjustment drive in the camera according to an embodiment of the present invention.
Figure 12:
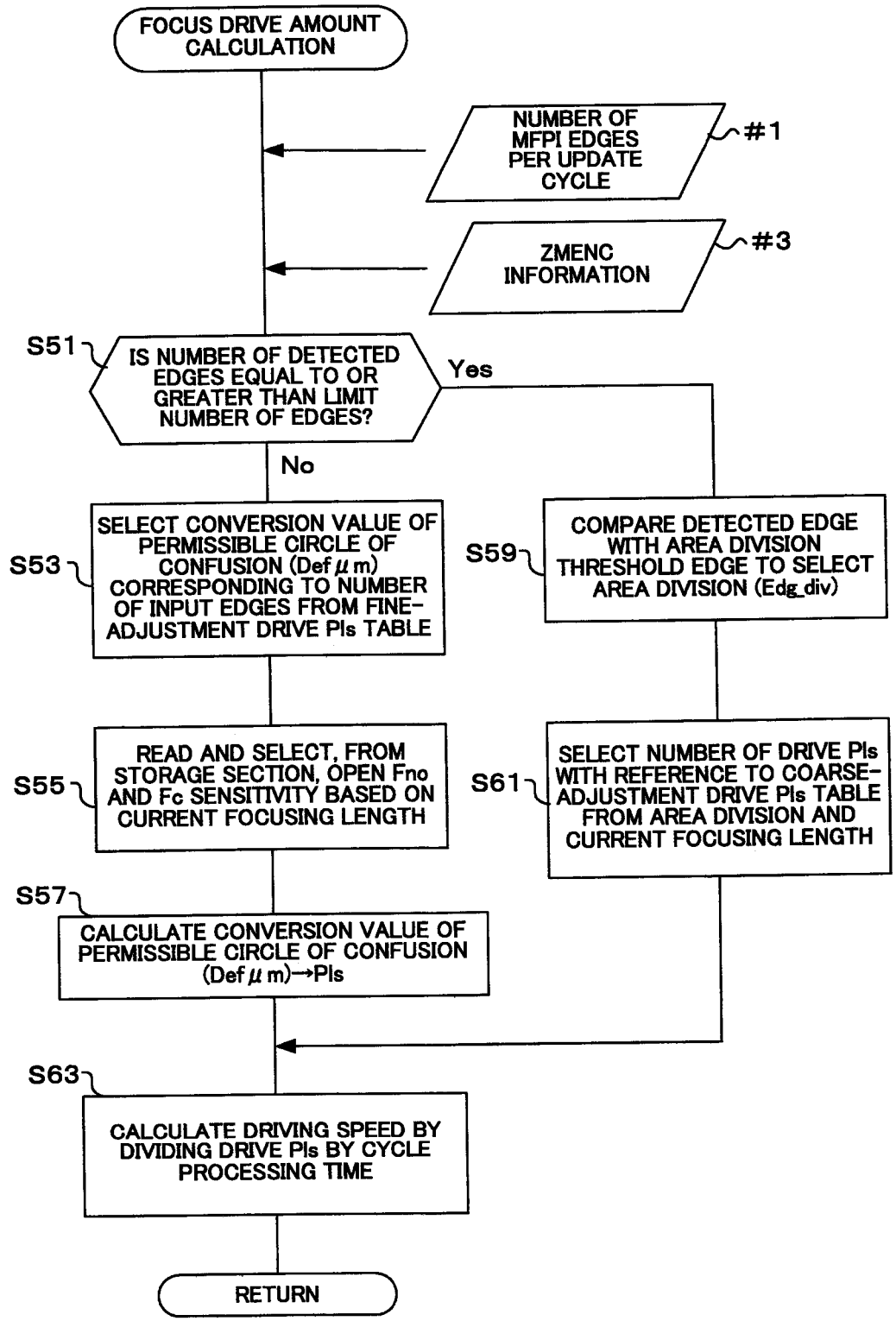
FIG. 12 is a flowchart illustrating the operation of focus drive amount calculation in the camera according to an embodiment of the present invention.

Moreover, the CPU 41 functions as a controller which calculates, based on the rotation amount detected by the rotation detector, a moving speed of the focusing lens and controls the movement of the focusing lens in accordance with the rotation direction at the moving speed calculated in a predetermined cycle period (e.g., see, a driving speed F315 of FIG. 5A, a driving speed F339 of FIG. 6A, S63 of FIG. 12, and the like).

Moreover, the above-described controller (CPU 41) sets the moving speed of the focusing lens resulting in a predetermined image plane movement amount with respect to the unit rotation amount of the ring member based on the first relationship stored in the memory, and controls the movement of the focusing lens in accordance with the rotation amount and rotation direction of the ring based on the moving speed (e.g., see FIG. 5A, FIG. 9B, and S59, S61, and S63 of FIG. 12). Moreover, the above-described controller (CPU 41) sets the moving speed with respect to the rotation speed of the ring based on the second relationship stored in the memory, and controls the movement of the focusing lens in accordance with the rotation amount and rotation direction of the ring based on the moving speed (e.g., see FIG. 6A, FIG. 9B, S53 to S57, and S63 of FIG. 12).

Moreover, the above-described controller (CPU 41) sets, when the rotation speed detected by the rotation speed detector is smaller than the predetermined value (e.g., see "No" in S51 of FIG. 12), the moving speed of the focusing lens resulting in a predetermined image plane movement amount with respect to the unit rotation amount of the ring based on the first relationship, sets the moving speed with respect to the rotation speed of the ring based on the second relationship when the rotation speed is larger than the predetermined value (e.g., see "Yes" in S51 of FIG. 12), and sets, when the rotation speed is the predetermined value (see Pf of FIG. 8), the moving speed based on the maximum value of the moving speed when the rotation speed is smaller than the predetermined value and the maximum value of the moving speed when the rotation speed is larger than the predetermined value.

Figure 14:
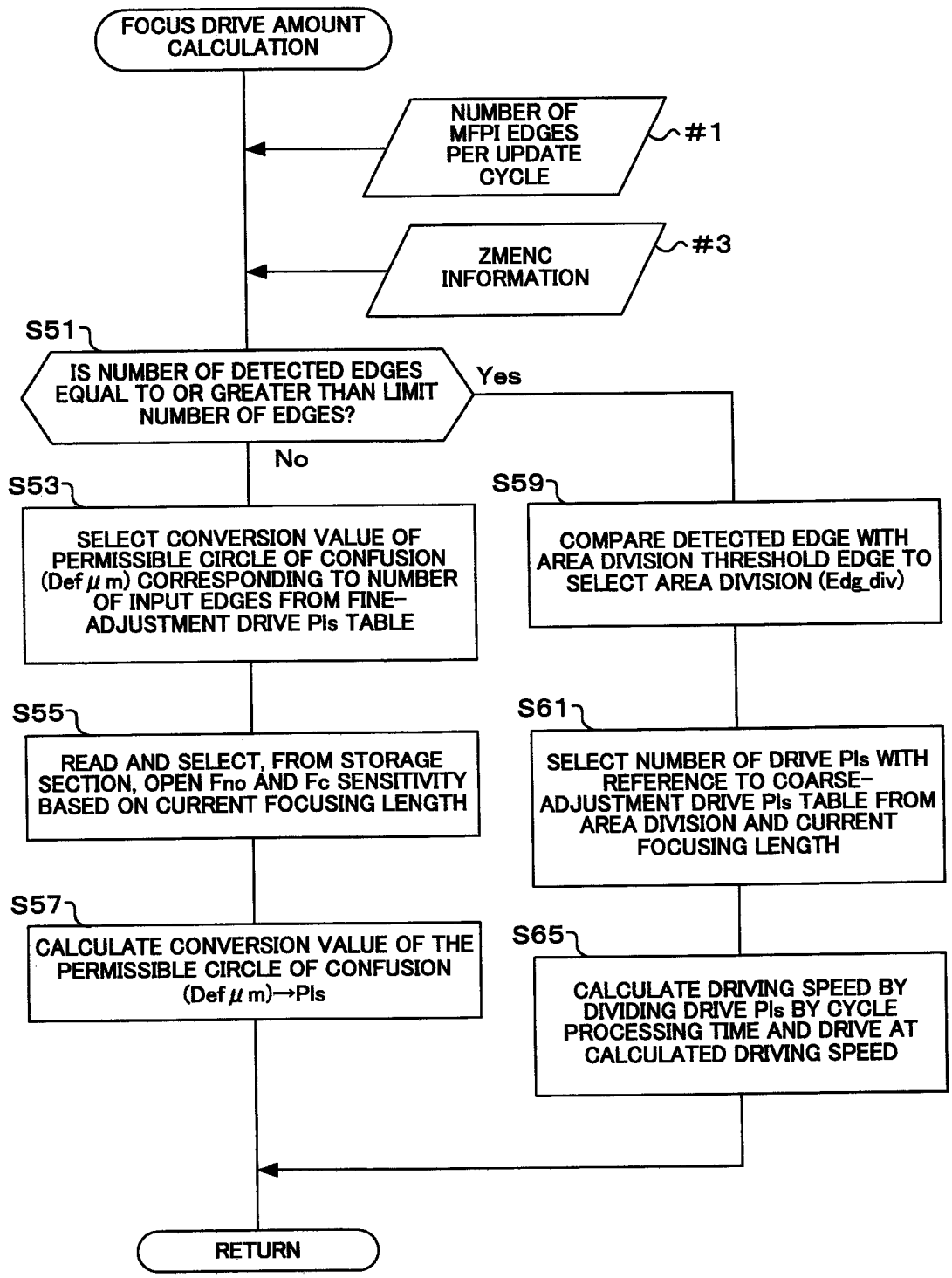
FIG. 14 is a flowchart illustrating the operation of focus drive amount calculation in the camera according to the modification of an embodiment of the present invention.

Moreover, the above-described controller (CPU 41) sets the moving speed of the focusing lens resulting in a predetermined image plane movement amount with respect to the unit rotation amount of the ring member based on the first relationship stored in the memory, and obtains the movement amount of the focusing lens in accordance with the rotation amount and rotation direction of the ring based on the moving speed to control the movement (e.g., see S59, S61, and S65 of FIG. 14). Moreover, the above-described controller (CPU 41) sets the moving speed with respect to the rotation speed of the ring based on the second relationship stored in the memory, and controls the movement of the focusing lens in accordance with the rotation amount and rotation direction of the ring based on the moving speed (e.g., see S53 to S57 of FIG. 14).

Moreover, the above-described controller (CPU 41) sets, when the rotation speed detected by the rotation speed detector is smaller than the predetermined value (e.g., see "No" in S51 of FIG. 14), a movement amount based on the moving speed of the focusing lens resulting in a predetermined image plane movement amount with respect to a unit rotation amount of the ring member based on the first relationship, sets, when the rotation speed is larger than the predetermined value (e.g., see "Yes" in S51 of FIG. 14), the moving speed with respect to the rotation speed of the ring based on the second relationship, and sets, when the rotation speed is a predetermined value (see Pf of FIG. 8), the moving speed based on the maximum value of the moving speed when the rotation speed is smaller than the predetermined value and the maximum value of the moving speed when the rotation speed is larger than the predetermined value.

Moreover, the above-described controller (CPU 41) sets the movement amount of the focusing lens resulting in a predetermined image plane movement amount with respect to the unit rotation amount of the ring member based on the first relationship stored in the memory, and controls the movement of the focusing lens in accordance with the rotation amount and rotation direction of the ring member based on the movement amount (e.g., see FIG. 5A, FIG. 9A, and S59, S61, and S63 of FIG. 12). The above-described controller (CPU 41) sets a movement amount with respect to the rotation speed of the ring based on the second relationship stored in the memory, and controls the movement of the focusing lens in accordance with the rotation amount and rotation direction of the ring based on the movement amount (e.g., see FIG. 6A, FIG. 9A, S53 to S57, and S63 of FIG. 12).

Moreover, the above-described controller (CPU 41) sets, when the rotation speed detected by the rotation speed detector is smaller than a predetermined value (e.g., see "No" in S51 of FIG. 12), a movement amount of the focusing lens resulting in a predetermined image plane movement amount with respect to the unit rotation amount of the ring member based on the first relationship, sets, when the rotation speed is larger than the predetermined value (e.g., see "Yes" in S51 of FIG. 12), the movement amount with respect to the rotation speed of the ring based on the second relationship, and sets, when the rotation speed is the predetermined value, a movement amount based on a maximum value of the movement amount when the rotation speed is smaller than the predetermined value and a maximum value of the movement amount when the rotation speed is larger than the predetermined value.

An image sensor 201, a CPU 203 inside the control section, a storage section 205, and an operation input section 207 are arranged inside the camera body 200. This image sensor 201 is arranged in a vicinity of an image forming position of the shooting lens 11, photoelectrically converts a subject image formed by the shooting lens 11 and outputs image data. Moreover, the CPU 203 communicates with the CPU 41 inside the interchangeable lens 100. The storage section 205 includes a program for controlling the whole camera system, and the CPU 203 controls the whole camera system. The operation input section 207 includes various operation members, such as a release button and cross button.

Next, the detail of the electric configuration will be explained using FIG. 2. The CPU 41 is capable of communicating with the camera body 200 as previously described. Moreover, the CPU 41 is connected to a motor driver 71, which drives LDPI 69, LDMT 73, AVMT 75, and AVPI 77.

The LDPI 69 is a photo interrupter for detecting the reference position of the focusing lens 11b, and the output of this LDPI 69 is connected to an LDPI binarization circuit 67. The LDPI 69 and LDPI binarization circuit 67 correspond to the previously-described focusing-lens reference position detection section 27.

The LDMT 73 is a lens driving motor (LD motor), and functions as the focusing-lens actuator inside the previously-described focusing-lens driving mechanism 25. Although as the LD motor, a stepping motor is employed in this embodiment, another motor, for example, a general VCM (voice coil motor) may be certainly used. When a VCM motor or the like is employed, a sensor for detecting the relative position of the focusing lens may be provided. The AVMT 75 is an aperture motor, and functions as the previously-described aperture actuator inside the aperture driving mechanism 21.

The AVPI 77 is a photo interrupter for detecting the reference position of the aperture 13, and the output of this AVPI 77 is connected to an AVPI binarization circuit 79. The AVPI 77 and AVPI binarization circuit 79 correspond to the previously-described aperture reference position detection section 23.

An MFPI driver 65 is the driver for the first MFPI 63a and second MFPI 63b for the purpose of detecting the turning of the range ring 51 when the range ring 51 is slid to the MF position. The first and second MFPIs 63a, 63b each include a photosensor and a light emission section, and are configured to allow passage of the light shielding blade between the photosensor and the light emission section. The MFPI driver 65 turns on or turns off the light emission sections of the first and second MFPIs 63a, 63b in accordance with an instruction from the CPU 41.

The first MFPI (in the view, abbreviated as "MFPI1") 63a and second MFPI (in the view, abbreviated as "MFPI2") 63b are provided at positions slightly apart from each other along the turning direction of the light shielding blade, respectively. The installation places of the first MFPI 63a and second MFPI 63b are set so as to provide such a positional relationship that the phase of the signal from the MFPI 63a and the phase of the signal from the MFPI 63b shift from each other by 90 degrees. Once the range ring 51 is rotationally operated by a user, then the light shielding blade moves together with the range ring 51, and the MFPI 63 becomes in a light shielding state or transmission state by this light shielding blade, so that pulse signals with the phases shifted from each other by 90 degrees are output from two of the first MFPI 63a and the second MFPI 63b.

The output of the first MFPI 63a is connected to the first MFPI binarization circuit 61a and binarized by the first MFPI binarization circuit 61a. Similarly, the output of the second MFPI 63b is connected to the second MFPI binarization circuit 61b and binarized by the second MFPI binarization circuit 61b. The rising and falling portions of the binarized pulse signal are referred to as edges. The first and second MFPI binarization circuits 61a, 61b, the first and second MFPIs 63a, 63b, and the MFPI driver 65 correspond to the previously-described MF position detection section 35.

The binarized pulse signal from the MFPI 63 is output to the CPU 41, the pulse (edge) corresponding to the rotation speed of the range ring 51 is counted by a two-phase counter inside the CPU 41, and the rotation direction is also detected.

A linear encoder RF position detection section 81 is a linear encoder for detecting the absolute value (angle of rotation) in the rotation direction of the range ring 51 when the range ring 51 is slid to the RF position. The linear encoder RF position detection section 81 is provided so that a detection contact moves in accordance with the turning of the range ring 51, and outputs an analog signal in accordance with the absolute position in the turning direction of the range ring 51. An A/D converter 43 is provided inside the CPU 41, and converts an analog signal from the linear encoder RF position detection section 81 to a digital signal. An A/D-converted value by the A/D converter 43 represents the shooting distance (absolute distance) specified by a user. The linear encoder RF position detection section 81 and A/D converter 43 correspond to the previously-described RF position detection section 31.

The linear encoder ZM position detection section 82 is an encoder for detecting an absolute value in the rotation direction of the zoom ring 52. The linear encoder ZM position detestation section 82 is provided along the turning direction of the zoom ring 52, and outputs an analog signal in accordance with an absolute position in the rotation direction of the zoom ring 52. The A/D converter 44 is provided inside the CPU 41, and converts an analog signal from the linear encoder ZM position detection section 82 to a digital signal. An A/D-converted value (referred to as "ZMENC") by the A/D converter 44 represents the focusing length set by a user.

The RF/MF mode detection switch (SW) 83 is a switch for detecting whether the range ring 51 is set to the RF mode or set to the MF mode. This RF/MF mode detection SW 83 detects a position in the optical axis direction of the range ring 51, and is turned on or off in setting the RF mode or in setting the MF mode, and this on or off state is output to the CPU 41.

Figure 3:
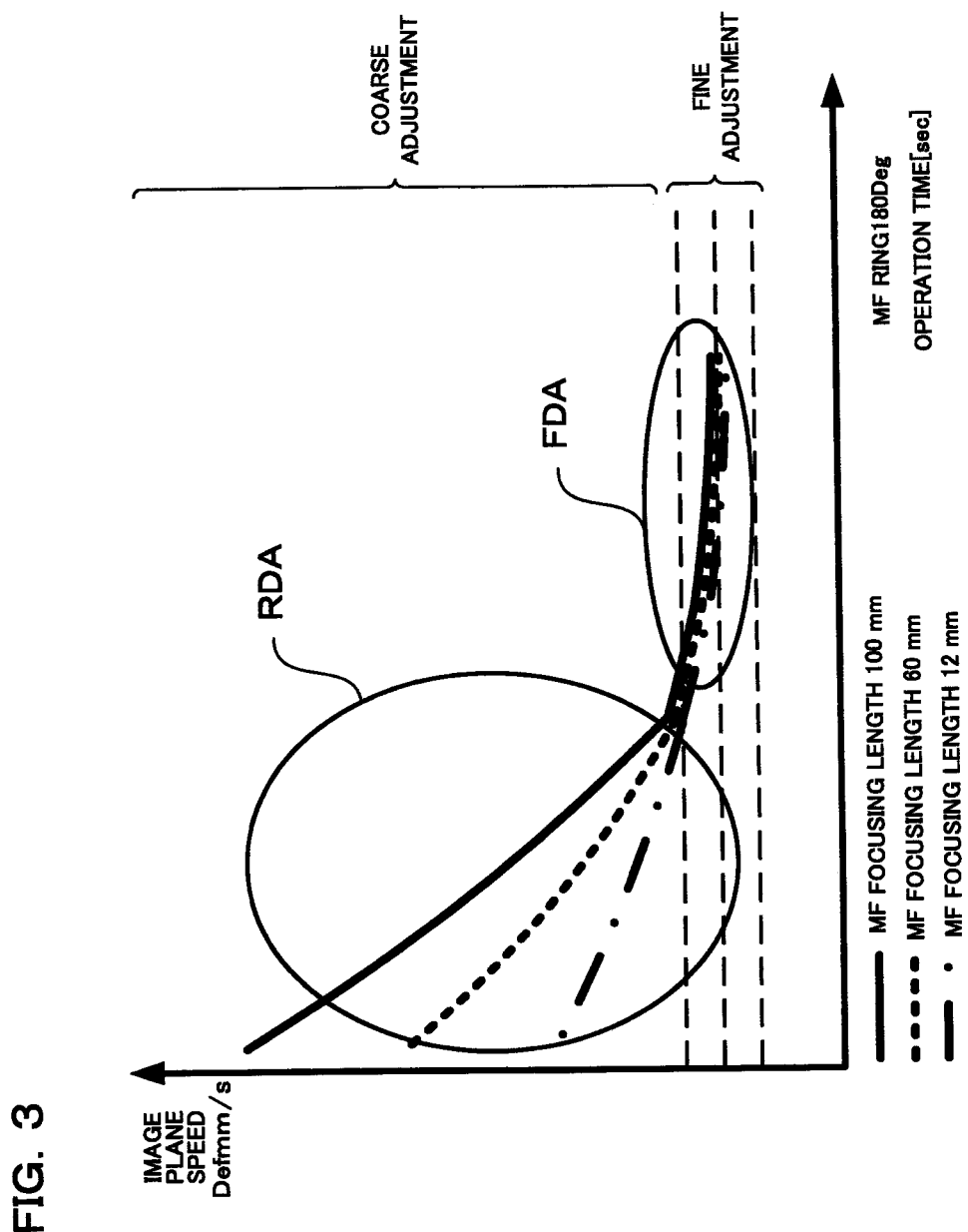
FIG. 3 is a graph illustrating the concept of a manual focusing in the camera according to an embodiment of the present invention.

Next, the outline of the manual focusing (MF control) in this embodiment will be explained using FIG. 3. In FIG. 3, the horizontal axis represents the operation time of the range ring 51 and the vertical axis represents the image plane speed for each focusing length (100 mm, 60 mm, 12 mm in the example illustrated in FIG. 3). Here, the operation time is the time (second) for rotating the range ring 51 by 180 degrees. Accordingly, the further to the right side on the horizontal axis, the more slowly the range ring 51 is moved (fine adjustment), while the further to the left side, the more quickly the range ring 51 is moved (coarse adjustment).

Moreover, the vertical axis represents the image plane moving speed, and the image plane moving speed is the moving speed of an optical image in the optical axis direction of the shooting lens on the plane of the image sensor 201 when the focusing lens is moved in accordance with the operation of the range ring 51. As illustrated in FIG. 3, the image plane speed is slow in the case of the fine adjustment, while in the case of the coarse adjustment the image plane speed is fast.

In the fine-adjustment control, "control is performed at a constant speed for the next cycle-processing time" so that the image plane movement amount per one cycle for counting the number of pulse input edges from the MFPI binarization circuits 61a, 61b based on the rotation operation of the range ring 51 becomes constant. In this embodiment, when the amount desired to be driven within one cycle is set to ⅓ of the general permissible depth±1 Fδ (a range of 2Fδ), 0.67 Fδ which is ⅓ of 2 Fδ is the focusing-lens drive amount corresponding to the movement amount of an image plane desired to move. In this example, the movement amount of an image plane desired to move by fine-adjustment control is attempted to be expressed in a format of the permissible depth Fδ multiplied by a coefficient x. In the case of fine-adjustment control, the focusing lens is driven at a constant speed at which the focusing lens moves by the image plane drive amount of 0.67 Fδ within one cycle regardless of Fno. or Fc sensitivity. Note that, the numerical value of x is changed in accordance with the conditions, and x Fδ is stored in the storage section as the converted value of the permissible circle of confusion Defμm described later.

The number of stroke pulses differs with the focusing length (zoom state), as previously described. Then, in the case of coarse-adjustment control, "control is performed so as to drive the focusing lens at a constant speed so that the same constant image plane speed is obtained by the same amount of operation of the range ring" regardless of the focusing length. For example, if the range ring 51 is moved by 120 degrees within one second, then on the long focus side (e.g., telephoto side), the control is performed at a constant speed for driving 20,000 Pls within one second (from telephoto infinity to closest distance Pls). Moreover, on the short focus side (e.g., wide side), control is performed at a constant speed for driving 2,000 Pls within one second (from wide infinity to closest distance Pls). Performing such a control enables constant speed control so that the ratio between the rotation speed of the range ring 51 and the movement amount of Pls becomes 1:1.

Accordingly, in a fine-adjustment control area FDA illustrated in FIG. 3, constant speed control is performed so that the image plane movement amount becomes constant. On the other hand, in a coarse-adjustment control area RDA, constant speed control is performed so that the ratio between the rotating operation amount of the range ring and the focus pulse driving amount Pls becomes 1:1. Therefore, in the fine-adjustment control area FDA in which a user rotationally operates the range ring 51 slowly, the image plane moving speed is constant, so that the focus adjustment matching to the user's sense of fine adjustment can be performed. Moreover, in the coarse-adjustment control area RDA in which a user rotationally operates the range ring 51 quickly, the focusing lens moves in accordance with the rotation speed of the range ring 51, so that quick focusing in accordance with the user's sense of operation can be performed.

Figure 4:
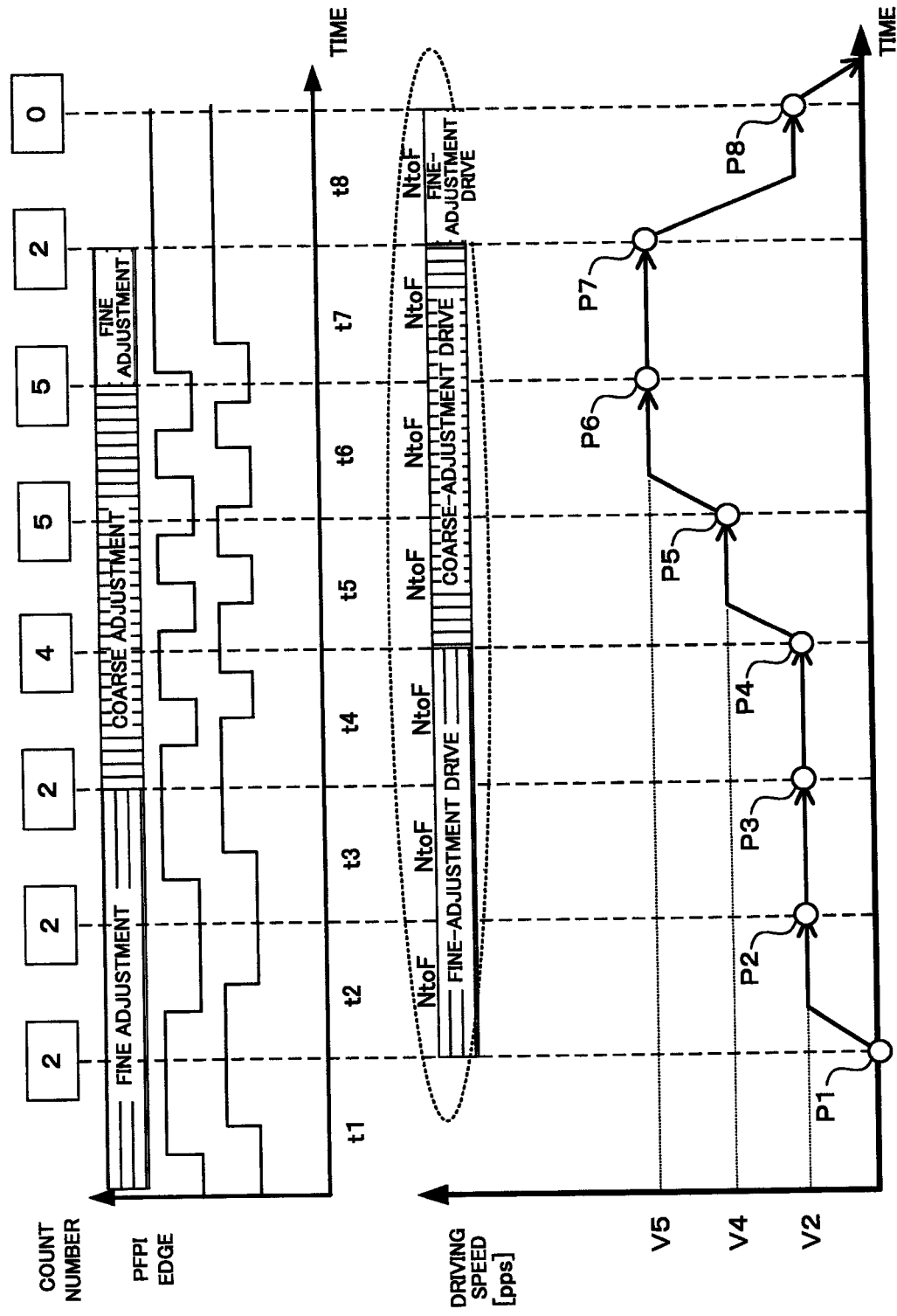
FIG. 4 is a timing chart illustrating the outline of the manual focusing control in the camera according to an embodiment of the present invention.

Next, the outline of manual focusing control (MF control) will be explained using FIG. 4. The upper part of FIG. 4 illustrates a change of the input edge of PFPI (output pulses of the MFPI binarization circuits 61a, 61b) after MF (manual focus) cycle processing, with the horizontal axis representing time. In the example illustrated in the upper part of FIG. 4, the count number of the input edges is two in the first cycle t1. The count number of the input edges is the number obtained by counting both the output pulses of the MFPI binarization circuits 61a, 61b. Also, in cycles t2 and t3, the count number of the input edges is two, and hereinafter similarly, in t4 the count number of the input edges is four, in t5 and t6 the count number of the input edges is five, and in t7 the count number of the input edges is two. In this embodiment, the count number of input edges ranging from 1 to 3 corresponds to fine-adjustment control, while the count number of the input edges equal to or greater than four corresponds to course-adjustment control. Note that the dotted line at the boundary between the respective cycles indicates the timing of the cycle processing.

The lower part of FIG. 4 illustrates the focusing-lens driving (FCS driving) speed in MF cycle processing, with the horizontal axis representing time. In FIG. 4, "NtoF" indicates driving from the closest distance side (N) to the infinite direction (F). Since the number of input edges in the cycle t1 is two, the fine-adjustment drive based on the number of input edges 2 is performed in the cycle t2. Hereinafter, in accordance with the number of input edges in the immediately previous cycle, fine-adjustment drive or coarse-adjustment drive is performed in the cycle to be controlled.

Hereinafter, the fine-adjustment drive control and coarse-adjustment drive control will be specifically explained.

Figure 11:
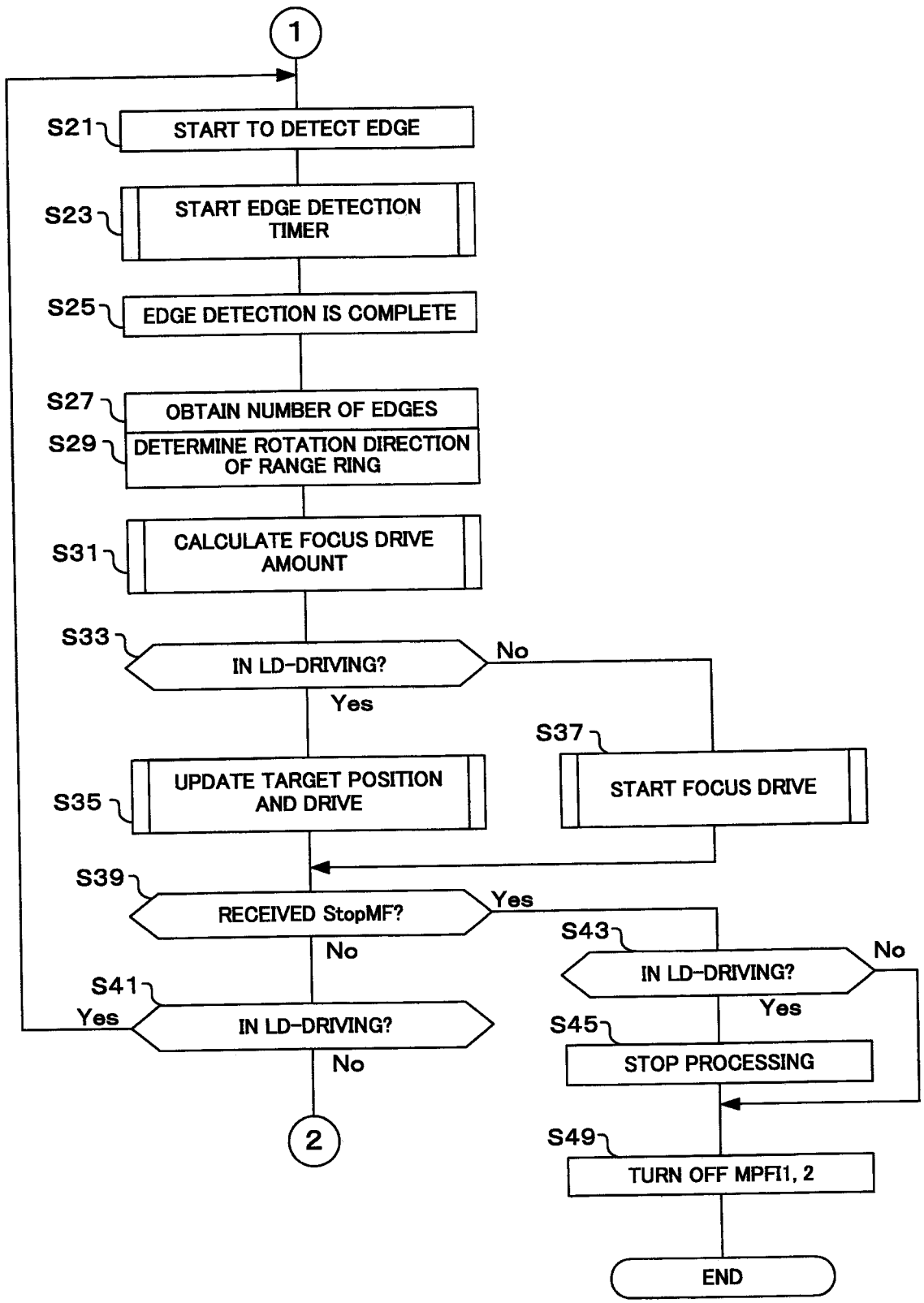
FIG. 11 is a flowchart illustrating the operation of manual focus (MF) driving in the camera according to an embodiment of the present invention.

(1) For each update cycle (at each of the time points P1 to P8) of PFPI (MFPI), the number of input edges of the PFPI edges input within one update cycle (t1, t2, ... of FIG. 4) is counted (see F301 of FIG. 5A, F331 of FIG. 6A, S27 of FIG. 11, and #1 of FIG. 12). Depending on the number of input edges of the PFPI edges, it is determined whether the adjustment is the fine adjustment or the coarse adjustment, and each target speed calculation is performed (see F315 of FIG. 5A, F339 of FIG. 6A, and S63 of FIG. 12). Moreover, based on the phases of two PFPI edges, either of the drive direction on the control infinity side or the drive direction on the control closest side is set. For the control target position, either of the control infinity end or the control closest end is set in accordance with the drive direction.

(2) The conditional branching is performed in accordance with the number of input edges, so that the processing of the fine-adjustment control or the coarse-adjustment control is performed. In the example illustrated in FIG. 4, if the number of input edges is in a range from 1 to 3, the adjustment is determined as fine adjustment, while if the number of input edges is equal to or greater than four, the adjustment is determined as coarse adjustment. Note that the threshold between the fine adjustment and coarse adjustment of the number of input edges may be referred to as a limit edge.

(Fine Adjustment)

When it is determined as the fine adjustment, based on the number of input edges, the driving Pls resulting in a predetermined conversion value of the permissible circle of confusion (Defμm) is calculated, and this drive pulse (Pls) is set to the one corresponding to a speed at which the focusing lens can finish moving within the cycle processing time, and is driven. Moreover, based on the current focusing length ZMENC detected by the linear encoder ZM position detection section 82, the Fc sensitivity is obtained to calculate the driving Pls.

In this embodiment, the focusing length is divided into 32 focusing lengths (ZM32 division) and the Fc sensitivity is stored for each of the divided focusing lengths. Moreover, the (open) Fno varying with the current focusing length ZMENC is obtained with reference to a table stored in the storage section 37. The focusing length is divided as previously described, and the Fno corresponding to this divided focusing length is obtained and an image plane movement amount is calculated from the conversion value of the permissible circle of confusion.

(Coarse Adjustment)

When the adjustment is determined as the coarse adjustment, based on the number of input edges, the focusing-lens drive pulse (Pls) is obtained with which the ratio between the rotation speed of the range ring and the movement amount of Pls becomes 1:1, and this drive pulse (Pls) is set to the one corresponding to a speed at which the focusing lens can finish moving within the cycle processing time, and is driven. In obtaining Pls, a difference between the stroke pulses is corrected based on the current focusing length ZMENC. The focusing length is divided, and the difference between the stroke pulse at the wide end and the stroke pulse at the telephoto end is corrected for each focusing length. Moreover, a focusing magnification (which differs for example by three times, ten times, and so on between wide end and telephoto end operation amounts and/or for each mirror frame) is corrected. Moreover, the correction is made so that a relationship between the driving Pls of the coarse adjustment and the driving Pls of the fine adjustment is not reversed.

(3) The number of Pls corresponding to the number of input edges obtained in (2) described above is converted to a speed at which the focusing lens can finish moving within the cycle processing time. Once converted, the drive direction (control infinity/control closest) and the driving speed are set to perform focus driving. Moreover, startup/continuation/stoppage of the operation is determined for each PFPI update cycle, the changes of the speed calculated for each cycle processing are smoothly connected in an acceleration/deceleration curve for driving.

Next, the detailed control processing of the fine-adjustment drive executed by the CPU 41 will be explained using FIG. 5A to FIG. 5D. FIG. 5A illustrates the outline of the processing for fine-adjustment drive. First, the number of input edges X [edge] is obtained (F301). Here, a pulse signal from the MFPI 63 which is generated in accordance with a rotational operation of the range ring 51 is binarized, and the rising and falling edges are counted to give the number of input edges X.

Once the number of input edges X is obtained, then search 1 is performed (F303). Here, an image plane movement amount Xa corresponding to the number of input edges X is searched with reference to a Table_Fd table having the fine-adjustment drive Pls stored therein (F321). The Table_Fd table is stored in the storage section 37 in advance, and stores the conversion value of the permissible circle of confusion Def [μm] for each number of input edges X[edge] as illustrated in FIG. 5B. This conversion value of the permissible circle of confusion is the result of calculation of "a setting value to set a movement amount of an image plane desired to move" (x)×δ, and is stored in the unit of [μm]. Note that, here, the number of input edges ranging from 1 to 5 is for fine-adjustment control.

Once the conversion value of the permissible circle of confusion Xa is searched by the search 1, then an open aperture value corresponding to the current focusing length is read from the open Fno table having the open aperture value for each focusing length stored therein (F323). The open Fno table is stored in the storage section 37 in advance. Once the open aperture value is read, an image plane movement amount Xb is calculated by calculating Formula (1) below (F305, F307).

$$Xb = Xa \times \text{open } Fno \quad (1)$$

Once the image plane movement amount Xb is calculated by the calculation 1, then the Fc sensitivity corresponding to the current focusing length is read from the Fc sensitivity table having the Fc sensitivity for each focusing length stored therein (F325). The Fc sensitivity table is stored in the storage section 37 in advance. The Fc sensitivity is a numerical value indicative of the inverse of the number of drive pulses of the focusing lens needed to move by a unit amount of image plane movement. Once the Fc sensitivity is read, a driving Pls Xc is calculated by calculating Formula (2) below (F309, F311).

Note that, calculation 2 (F309) may be performed based on the calculation formula shown in (2) below, but as illustrated in FIG. 5C, a table, in which each corresponding driving Pls is shown with the vertical item representing the number of input edges X and the horizontal item representing the focusing length ZMENC, may be stored in the storage section 37 in advance so as to obtain the driving Pls by referring to this table.

$$Xc[\text{Pls}] = Xb / Fc \text{ sensitivity} \quad (2)$$

Once the driving Pls Xc is determined, then the driving speed Xd is calculated using this driving Pls Xc, an MF cycle time F327, and main management Pls information F329 (F313). The driving speed Xd is a speed at which the driving Pls Xc can finish within the MF cycle time. In calculation 3 (F313), the driving speed is calculated based on Formula (3) below. Note that the main management Pls information is the information about the coefficient for converting a difference in the dimension in calculating the driving speed from the driving Pls. In this example, the dimension of the driving speed is expressed using the condition under which a stepping motor is driven at a 1/16 micro-step.

$$Xd[\text{pps@}1/16p] = Xc \times (16/\text{main management Pls unit}) / (\text{MF cycle time}) \quad (3)$$

Note that the calculation 3 (F313) may be performed based on the calculation formula shown in (3) above, but since the drive Pls is determined based on the focusing length ZMENC and the number of input edges X, as illustrated in FIG. 5D, the driving speed may be obtained by referring to a table in which each corresponding driving speed is shown with the vertical item representing the number of input edges X and with the horizontal item representing the focusing length ZMENC and which is stored in the storage section 37 in advance.

When the number of input edges is equal to or less than a predetermined number (e.g., equal to or less than two), the fine-adjustment drive of the focusing lens 11b is performed by the lens drive motor LDMT 73 at the driving speed (F315) obtained by the calculation 3 (F313).

Next, the coarse-adjustment drive control will be explained. FIG. 6A illustrates the outline of the processing for coarse-adjustment drive executed by the CPU 41. First, as with the case of fine-adjustment drive, the number of input edges X [edge] is obtained (F331). Note that, here, the number of input edges ranging from 6 to 20 is for coarse-adjustment control (the number of input edges ranging from 1 to 5 is for fine-adjustment control).

Once the number of input edges X is input, branching (F333) is performed with reference to an area division threshold edge table (F341). The area division threshold edge (Edg_div_thresh) table is stored in the storage section 37 in advance. This table stores the threshold for dividing an area in accordance with the number of input edges X, and at the branching 1, branching is performed with reference to the threshold stored in this table. An example of the area division threshold edge table is illustrated in FIG. 6B. For example, area 1 when the number of input edges ranges from 6 to 7 (fine-adjustment drive when the number of input edges is equal to or less than 5), area 2 when the number of input edges ranges from 8 to 9, area 3 when the number of input edges ranges from 10 to 11, and so on, and also each threshold coefficient (described later) is determined.

Once the branching 1 is performed, then a reference table is selected (F335). Since an area corresponding to the number of input edges X is determined using the area division threshold edge, a reference table (Table_Edg_div) corresponding to this area is selected.

Once the reference table (Table_Edg_div) is selected, then the search 1 is performed using the Table_Edg_div table (F343) having the number of coarse-adjustment driving Pls stored therein for each focusing length (F336). This Table_Edg_div table includes seven tables: Table_Edg_div1 to Table_Edg_div7, corresponding to the areas 1 to 7, respectively, and each table has stored therein a focusing length and the number of Pls for performing coarse-adjustment drive corresponding to the focusing length. Accordingly, in the search 1, an area corresponding to the number of input edges X is determined, a reference table is selected, and the number of driving Pls corresponding to the focusing length is searched using the selected reference table.

Once the number of driving Pls Xe is searched in the search 1 (F337), then in the calculation 1, a driving speed Xf is calculated using the number of driving Pls Xe, an MF cycle time F345, and main management Pls information F347. The calculation here is performed based on Formula (4) below.

$$Xf=Xex(16/\text{main management Pls unit})/(\text{MF cycle time}) \quad (4)$$

Once the driving speed is obtained when the number of input edges is equal to or greater than a predetermined number (e.g., equal to or greater than three), then the coarse-adjustment drive of the focusing lens 11b is performed by the lens drive motor LDMT 73 at the driving speed (F339) obtained in the calculation 1 (F338).

Next, FIG. 7A and FIG. 7B are tables in which the focusing length ZMENC corresponds to MaxPlsf that is the maximum drive pulse value of the fine-adjustment drive Pls and to MaxPlsr that is the maximum drive pulse value of the coarse-adjustment drive Pls, the MaxPlsf and MaxPlsr being used in order to smoothly switch the control in a vicinity of the boundary between fine-adjustment control and coarse-adjustment control.

The maximum Pls (MaxPlsf) of the fine-adjustment drive Pls and the maximum Pls (MaxPlsr) of the coarse-adjustment drive Pls are determined as follows. MaxPlsf of the fine-adjustment drive is determined, as previously described, based on the operation speed of the range ring 51 and the conversion coefficient of the permissible circle of confusion during the fine-adjustment operation. Specifically, MaxPlsf of the fine-adjustment drive is the driving Pls (F311) which is calculated by the processing of FIG. 5A based on the conversion value of the permissible circle of confusion Defμm of five (maximum value of the number of input edges of fine-adjustment control) of the number of input edges of FIG. 5B. Then, because the open Fno and Fc sensitivity differ with the focusing length (ZMENC), the driving Pls calculated by taking this into account is shown in FIG. 7A. Moreover, MaxPlsr of the coarse-adjustment drive is determined based on what operation speed is used in accordance with the operation angle of the range ring 51 and based on the number of Pls from the infinity to closest of the focusing length, as previously described. Specifically, a reference table (Table_Edge_div7) corresponding to the area 7 (the number of input edges is equal to or less than 20) of FIG. 6B is shown in FIG. 7B.

Figure 8:
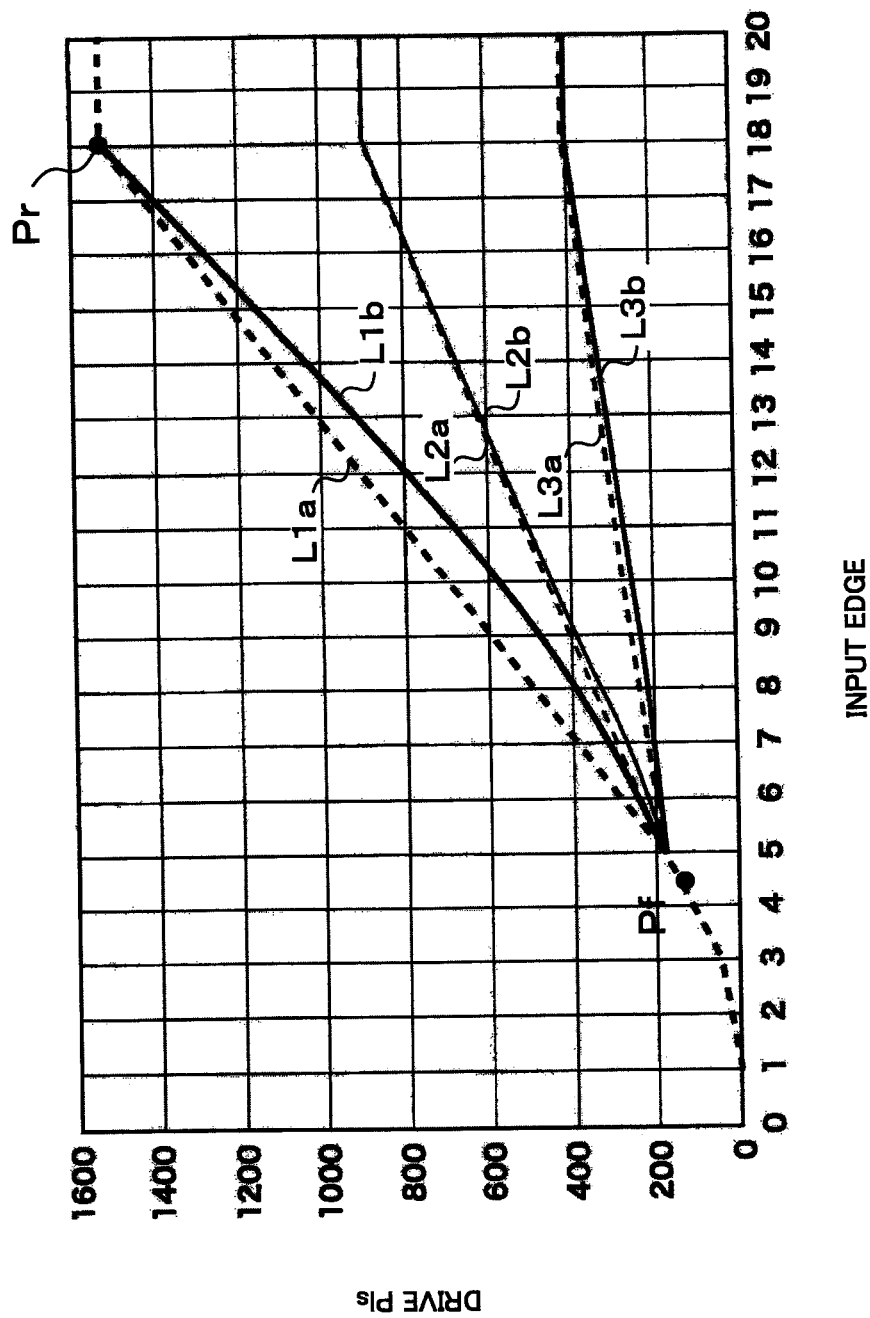
FIG. 8 is a graph illustrating a relationship between a driving Pls and the number of input edges at each focusing length (zoom position) in the camera according to an embodiment of the present invention.

Next, the number of driving Pls versus the input edge at each focusing length (ZM position) will be explained using FIG. 8. As previously described, in this embodiment, the number of edges resulting from operating the range ring 51 within a predetermined time (update cycle) is counted, and in accordance with this number of edges the driving speed of the focusing-lens drive motor (LDMT 73) is obtained for control. In FIG. 8, the horizontal axis represents the number of input edges, while the vertical axis represents the driving Pls. In the example illustrated in FIG. 8, when the number of input edges is less than five, the fine-adjustment control is performed, while when the number of input edges is equal to or greater than five, the coarse-adjustment control is performed. The area in which the number of input edges ranges from 5 to 18 is the transitional area inside the coarse-adjustment control area. Here, provision is made so that the adjustment control is smoothly changed from fine-adjustment control to coarse-adjustment control.

In FIG. 8, a point Pr is MaxPlsr (corresponding to the number of input edges 5) of the coarse adjustment while a point Pf is MaxPlsf (corresponding to the number of input edges 18) of the fine adjustment. The driving Pls in the transitional area inside the coarse-adjustment control area is obtained with a linear line L1a connecting between the point Pr of coarse adjustment MaxPlsr and the point Pf of fine adjustment MaxPlsf as a base. Then, this linear line L1a is weighted using a threshold coefficient of the specified edge illustrated in FIG. 6B to calculate a curve L1b. The driving Pls in the transitional area is obtained using this curve L1b. For example, in the case of the number of input edges 12 of the linear line L1a, the corresponding area is the area 4 of the number of edges equal to or less than 13 from FIG. 6B and the threshold coefficient is 0.9, so the driving Pls=890 is weighted by the threshold coefficient, resulting in 890× 0.9=800 (number of input edges of L1b is 12). Linear lines L2a, L3a and curves L2b, L3b indicate the cases of different focusing lengths.

Next, tables each showing a relationship of the number of driving Pls versus the number of input edges at each focusing length (ZM position) will be explained using FIG. 9A and FIG. 9B. The table shown in FIG. 9A indicates a relationship of the number of driving Pls versus the number of input edges corresponding to the curves L1b, L2b, and L3b illustrated in FIG. 8. In FIG. 9A, for each current focusing length ZMENC (ZM0, ZM1, . . . ), the number of driving Pls (P(1:0), P(1:1), . . . ) corresponding to the number of input edges (1, 2, 3, . . . ) is shown. Note that, this table includes not only the transitional area, but also the fine adjustment area and the coarse adjustment area other than the transitional area. The driving Pls may be obtained by storing such a table into the storage section 37 in advance and referring to the number of input edges and ZMENC as an input.

A table, in which the driving Pls with respect to the input edges 6 to 20 corresponding to the coarse-adjustment control of FIG. 9A are converted into driving speeds by the calculation shown in the "calculation 1" (F338) of the coarse-adjustment control, is illustrated in a part of FIG. 9B. Then, a table, in which the driving Pls with respect to the input edges 1 to 5 corresponding to the fine-adjustment control of FIG. 9A are converted into driving speeds by the calculation shown in the "calculation 3" (F313) of the fine-adjustment control, is illustrated in a part of FIG. 9B. In this table, Vol(1:0) is a value obtained by converting P(1:0) of the driving Pls into a driving speed. Vol(1:1), . . . are also values obtained by converting P(1:1), . . . into driving speeds.

Next, an operation example in this embodiment will be explained in detail using the previously-described FIG. 4. At an end time point P1 (cycle processing update timing) of the cycle t1, the number of input edges of PFPI (MFPI) input within the period of the cycle t1 is determined. At this cycle processing update timing, a target driving speed (V2) is calculated (the driving speed is calculated by the processing of fine-adjustment control of FIG. 5A or the driving speed is calculated by the processing of coarse-adjustment control of FIG. 6A) and the focusing lens motor (LDMT 73) is activated. If the target driving speed needs acceleration/deceleration, acceleration/deceleration control will be performed. At the time of activation, a control end is driven as a target position. In the example illustrated in FIG. 4, after setting the control infinity to a target position, from the closest distance to the infinite direction (NtoF), the driving is started.

Note that, in FIG. 5A and FIG. 6A, the number of input edges ranging from 1 to 5 corresponds to fine-adjustment control and the number of input edges equal to or greater than 6 corresponds to coarse-adjustment control, but as previously described, in FIG. 4, the number of input edges ranging from 1 to 3 corresponds to fine-adjustment control and the number of input edges equal to or greater than four corresponds to coarse-adjustment control. Between the cycles t1 to t3, since the number of input edges is two and does not change, the target driving speed to be calculated does not change either, while between the cycles t2 to t4 a constant speed drive is performed at the same speed (V2).

At an end time point P4 (cycle processing update timing) of the cycle t4, the number of input edges of PFPI (MFPI) in t4 is determined. In the example illustrated in FIG. 4, the number of input edges becomes four, the target driving speed is changed, and the speed becomes V4 in the cycle t5. Since the number of input edges becomes four, the adjustment drive switches from fine-adjustment drive to coarse-adjustment drive, but only the calculation formula of the target driving speed is changed and there is no change in the control.

At an end time point P5 (cycle processing update timing) of the cycle t5, the input edge of PFPI (MFPI) at t5 is determined. In the example illustrated in FIG. 4, the number of input edges becomes five, the target driving speed is changed, and constant speed drive is performed at a speed V5 in the cycle t6. In the subsequent cycle 7, since the number of input edges in the immediately previous cycle t6 is five, and does not change, the speed V5 is maintained and the constant speed drive is performed.

At an end time point P7 (cycle processing update timing) of the cycle t7, the input edge of PFPI (MFPI) in t7 is determined. In the example illustrated in FIG. 4, the number of input edges becomes two, the adjustment control becomes fine-adjustment control, and the target speed is changed, and constant speed drive is performed at a constant speed V2 in the cycle t8.

At an end time point P8 (cycle processing update timing) of the cycle t8, the number of input edges is detected as zero and the driving is stopped. If acceleration/deceleration control is required, the deceleration control is performed to stop driving. The driving pulses (Pls) corresponding to passing by the target position as the result of the deceleration control does not cause a problem in the coarse-adjustment control, so is allowed.

Next, the operation of manual focusing (MF) will be explained using the flowcharts illustrated in FIG. 10 to FIG. 12. These flowcharts (as well as the flowcharts illustrated in the FIG. 13 and FIG. 14 described later) are executed by the CPU 41 which controls each section inside the interchangeable lens 100 according to a program stored in the storage section 37.

Figure 10:
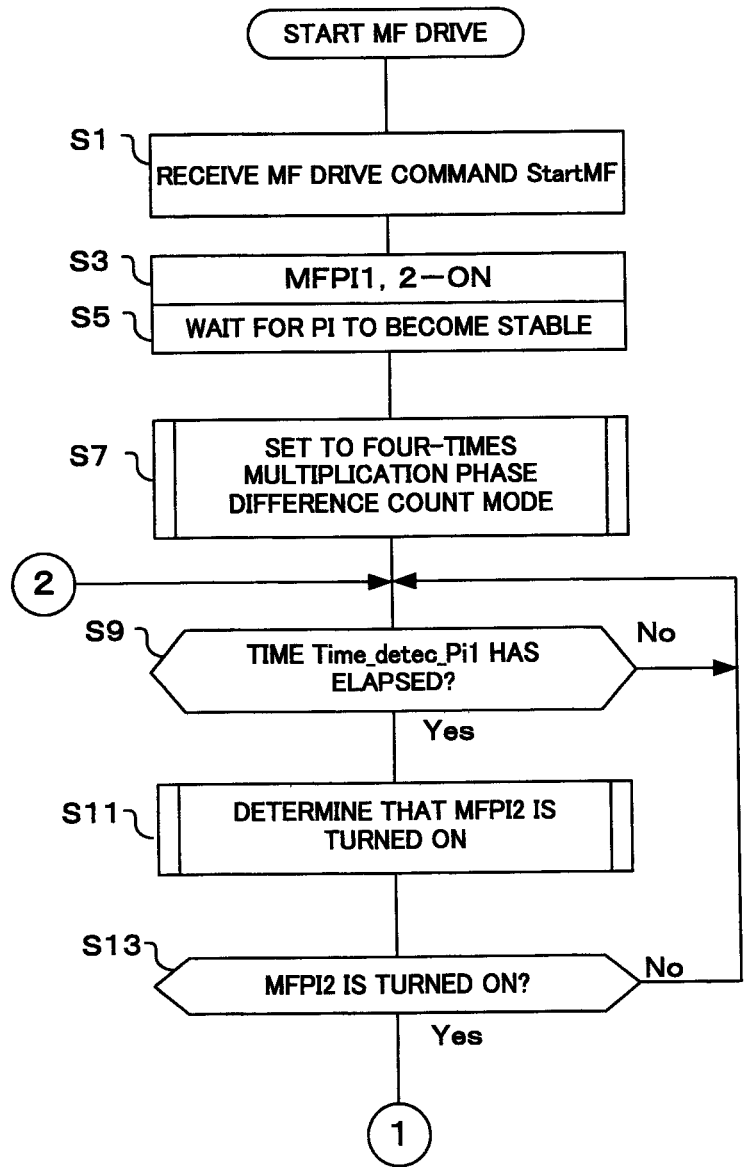
FIG. 10 is a flowchart illustrating the operation of manual focus (MF) driving in the camera according to an embodiment of the present invention.

Once an MF driving flow illustrated in FIG. 10 is started, then first, an MF driving command is received from the CPU 203 inside the body section 200 (S1). In a state where the MF mode is set by slide of the range ring 51 and the RF mode detection section 33 detects the fact that the range ring 51 is set at the MF position, the flow waits for reception of the MF driving command from the CPU 203. Upon reception of the MF driving command, MF (manual focus) driving is started. Note that, the AF operation is possible even in a state where the range ring 51 is set at the MF position, and the AF driving command from the CPU 203 can be received to execute the AF operation and the MF driving command can be received to execute the MF operation.

Upon reception of the MF driving command, the first and second MFPIs 63a, 63b are turned on (S3), and the flow waits for the PI (photo interrupter) to become stable (S5). In the MF mode, the drive control of the focusing lens 11b is performed in accordance with the pulse signals of the first and second MFPIs 63a, 63b which are generated in accordance with the rotation operation of the range ring 51. Therefore, in step S5, the first and second MFPIs 63a, 63b for detecting the rotation operation of the range ring 51 each are set to an operation state, and the flow waits for the output signal to become stable.

Upon completion of waiting for PI to become stable, the mode is set to a four-times multiplication phase-difference count mode (S7). Here, in detecting the rotation amount and rotation direction of the range ring 51 using the first and second MFPIs 63a, 63b and the first and second MFPI binarization circuits 61a, 61b, the mode is set to the four-times multiplication phase-difference count mode. The four-times multiplication phase-difference count mode is the mode in which both the two photo interrupters (MFPI 63a, 63b) are turned on and the number of input edges of the pulse of each of the MFPIs 63a, 63b is counted.

Once the mode is set to the four-times multiplication phase-difference count mode, then it is determined whether or not an undetected MF edge determination time Tim_detec_pi1 has elapsed (S9). Here, it is determined whether or not the undetected MF edge determination time during turning off has elapsed. When Tim_detec_pi1 has not elapsed as the result of determination, the flow waits for Tim_detec_pi1 to elapse.

When Tim_detec_pi1 has elapsed as the result of the determination in step S9, then it is determined that MFPI2 is turned on (S11). Here, in accordance with the operation state of the range ring 51, it is determined whether or not to turn off the second photo interrupter 63b or whether or not to turn on it. That is, when the second photo interrupter 63b is turned on, it is determined whether or not to turn off this, while when the second photo interrupter 63b is turned off, it is determined whether or not to turn on this. Moreover, in accordance with the turned-on or turned-off state of the second photo interrupter 63b, either of the four-times multiplication phase-difference count mode or up/down count mode is set, and a method for counting input edge signals from the photo interrupters (MFPI1, 2) is determined.

Once it is determined that MFPI2 is turned on in step S11, then it is determined whether or not the second photo interrupter 63b (MFPI2) is turned on (S13). As previously described, in a subroutine for determining that MFPI2 is turned on of step S11, the second photo interrupter 63b (MFPI2) is set to the turned-on state or turned-off state. In this step S13, it is determined based on the setting state in step S11. When the second photo interrupter 63b (MFPI2) is tuned off as the result of this determination, the flow returns to step S9.

When the MFPI2 is turned on as the result of the determination in step S13, edge detection (detection of the number of input edges) is started (S21). Once the second photo interrupter 63b (MFPI2) is turned on, the first and second MFPI binarization circuits 61a, 61b binarize the pulse signals from the first and second photo interrupters 63a, 63b. With this binarization, the time of switching from H level to L level (falling) or from L level to H level (rising) can be detected as an edge. The outputs of the first and second MFPI binarization circuits 61a, 61b are connected to the counter of the CPU 41, respectively, and this counter counts the number of input edges which are input in the four-times multiplication phase-difference count mode.

Upon start of the edge detection, a clocking operation of an edge detection timer is started (S23), and then the edge detection ends after an MFPI monitor cycle (update cycle) has elapsed (S25). Here, the clocking operation is performed in a relatively longer detection cycle.

Upon completion of the edge detection, the number of edges (number of input edges) is obtained from the counter (S27), and the rotation direction of the range ring is determined (S29). As previously described, the counter inside the CPU 41 counts, in the four-times multiplication phase-difference count mode, the number of edges of the pulse signals output from the first and second MFPI binarization circuits 61a, 61b, so a counter value during edge detection is obtained as the number of edges (number of input edges). Moreover, two of the first and second MFPIs 63a, 63b are arranged so that the phase difference between the pulse signals becomes 90 degrees. In the four-times multiplication phase-difference count mode, the rotation direction of the range ring 51 is determined by determining which of these two pulse signals leads.

Once the rotation direction of the range ring is determined, then focus drive amount calculation is performed (S31). Here, the focus drive amount (number of Pls) is calculated based on the number of edges (number of input edges) obtained in step S21. Here, in the manual focus explained using FIG. 3 to FIG. 9B, the drive amount and driving speed for performing the fine-adjustment or coarse-adjustment drive are calculated. Detailed operation of this focus drive amount calculation will be described later using FIG. 12.

Once the focus drive amount calculation is performed, then it is determined whether or not it is in LD driving (in focusing-lens driving) (S33). It is determined whether or not it is in LD driving, i.e., whether or not the focusing lens 11b is being driven. When the focusing lens 11b is not being driven as the result of this determination, focus driving is started (S37). Here, the CPU 41 causes the lens drive motor LDMT 73 to start driving via the motor driver 71 in accordance with the focus drive amount (number of Pls) and driving speed calculated in step S31.

On the other hand, when the focusing lens 11b is being driven as the result of the determination in step S33, the target position is updated (S35). Because the number of edges (number of input edges) is obtained and the focus drive amount is calculated for each MFPI monitor cycle, in this step the target position is updated in accordance with the newly calculated focus drive amount (number of Pls).

Once the focus driving is started in step S37 or the target position is updated in step S35, then it is determined whether or not a StopMF command has been received (S39). Once a user cancels the manual focus (MF) mode, the StopMF command is transmitted to the interchangeable lens 100 from the camera body 200. In this step, the determination is made based on whether or not this StopMF command has been received.

When the StopMF command has not been received as the result of the determination in step S39, then as in step S33 it is determined whether or not it is in LD driving (in focusing-lens driving) (S41). When the focusing lens 11b is being driven as the result of this determination, the flow returns to step S21 to execute the previously-described operation. On the other hand, when the focusing lens 11b is not being driven, the flow returns to step S9 to execute the previously-described operation. In this case, when it is determined that a user is not rotationally operating the range ring 51 as the result of the determination that MFPI2 is turned on of step S11, the second photo interrupter 63b (MFPI2) is turned off.

When the flow returns to step S39 and the StopMF command has been received as the result of the determination in this step, then as in step S33 it is determined whether or not it is in LD driving (S43). When the focusing lens 11b is being driven as the result of this determination, stop processing is performed (S45). Here, the CPU 41 stops the driving of the lens drive motor LDMT 73 via the motor driver 71.

When the focusing lens 11b is not being driven as the result of the determination in step S43 or when the stop processing is performed in step S45, the first and second photo interrupters 63a, 63b (MFPI1, 2) are turned off (S49). Once this turn-off processing is performed, the MF driving flow is terminated.

Next, the operation of the focus drive amount calculation in step S31 will be explained using the flowchart illustrated in FIG. 12. In processing this flow, the number of MFPI edges per update cycle (#1) and ZMENC information (#3) are referred to. Among them, the number of MFPI edges per update cycle is the number of edges (number of input edges) obtained in step S27, and is temporarily stored in the storage section 37. Moreover, the ZMENC information is the current focusing-length information, is output from the linear encoder ZM position detection section 82, is converted to a digital value by the A/D converter 44 and is temporarily stored in the storage section 37.

Once the flow of focus drive amount calculation illustrated in FIG. 12 is started, first it is determined whether or not the number of detected edges is equal to or greater than a limit number of edges (S51). Here, the determination is made by comparing the number of MFPI edges per update cycle obtained and temporarily stored in step S27 with the threshold (limit number of edges) for branching into the coarse adjustment or the fine adjustment. Note that this threshold (limit number of edges) is stored in the storage section 37 in advance.

When the number of detected edges is equal to or greater than the limit number of edges as the result of determination in step S51, calculation of the number of driving Pls for coarse-adjustment control is performed in steps S59, S61. First, the number of detected edges (number of input edges) is compared with the area division threshold edge so as to select a division area (Edg_div) (S59). Here, the processing at the "branch 1 (F333)" explained using FIG. 6A is performed, and the number of detected edges (number of input edges X in FIG. 6A) is compared with the area division threshold edge (Edg_div_thresh) so as to select a division area.

Once an area division is selected in step S59, then the number of driving Pls is selected (S61) with reference to the coarse-adjustment drive Pls table (a correspondence table among the Table_Edge_div1-7) from the area division (Edg_ div) and the focusing length (ZMENC). Here, the "search 1 (F336)" of FIG. 6A is performed. That is, the number of driving Pls is selected from the coarse-adjustment drive Pls table (Table_Edg_div (F343)) with reference to a corresponding table among Table_Edge_div1-7 using the information about the area division (Edg_div) and focusing length (ZMENC). This selected number of driving Pls results in the drive amount in performing coarse-adjustment drive.

On the other hand, when the number of detected edges is less than the limit number of edges as the result of the determination in step S51, calculation of the number of driving Pls of fine-adjustment control is performed in steps S53 to S57. First, the conversion value of the permissible circle of confusion (Defμm) corresponding to the number of input edges is selected from the fine-adjustment drive Pls table (S53). Here, processing of the "search 1 (F303)" in FIG. 5A is performed. That is, based on the number of MFPI edges per update cycle (number of input edges) obtained and temporarily stored in step S27 and with reference to the Table_Fd table (F321 of FIG. 5A) having the fine-adjustment drive Pls stored therein, the conversion value of the permissible circle of confusion (Defμm) (Xa of FIG. 5A) corresponding to the number of input edges X is selected.

Once the conversion value of the permissible circle of confusion (Defμm) is selected, then selection is made from the table data having stored therein the open Fno and Fc sensitivity based on the current focusing-length information (S55). Since the open Fno and Fc sensitivity differ for each focusing length (ZMENC), Fno is selected from the open Fno table (F323 of FIG. 5A) based on the current focusing-length information ZMENC information obtained in #3. In addition, the Fc sensitivity corresponding to the current focusing length is selected from the Fc sensitivity table (F325 of FIG. 5A).

Once the open Fno and Fc sensitivity are selected, the number of driving Pls is calculated from the conversion value of the permissible circle of confusion (Xa) (S57). Here, the calculation 1 (F305) and calculation 2 (F309) are performed, with the conversion value of the permissible circle of confusion Xa (F303) of FIG. 5A as the input. That is, the previously-described Formula (1) is applied to the conversion value of the permissible circle of confusion (Xa). That is, the image plane movement amount Xb is calculated based on Xb=Xa×open Fno. Moreover, the previously-described Formula (2) is applied to the image plane movement amount Xb, i.e., the number of driving Pls Xc is calculated based on Xc [Pls]=Xb/Fc sensitivity.

Once the number of driving Pls is obtained in step S57 or S61, the driving speed is calculated (S63). Here, the driving speed is obtained by dividing the number of driving Pls obtained in step S57 or S61 by the cycle processing time. For the fine-adjustment control, the "calculation 3" (F313) of FIG. 5A is performed, while for the coarse-adjustment control, the "calculation 1" (F338) of FIG. 6A is performed. The focusing lens is driven using the driving speed obtained here (see S35, S37 of FIG. 11). Once the driving speed is obtained, the focus drive amount calculation flow is terminated and the flow returns to the original flow.

As explained above, in this embodiment, switching can be smoothly made in a vicinity of the boundary between the fine-adjustment drive and coarse-adjustment drive. That is, in the conventional control, the calculation formula for the fine adjustment and the calculation formula for the coarse adjustment are separate. Therefore, a step occurs at a joint between the fine adjustment and the coarse adjustment. Notably, in the zoom lens, the step state at the joint varies with the focusing length. Then, in this embodiment, a coarse adjustment speed is attempted to be calculated by using the Max speed of the fine adjustment in calculating the driving speed table for the coarse adjustment (see FIG. 8). Therefore, in this embodiment, the operability is improved by attempting to smooth a change in speed in a vicinity of switching between the fine adjustment and the coarse adjustment.

Moreover, in order to cause the operation of a user to further agree with the tracking of the focusing lens (FCS) driving, a scheme for calculating a target speed instead of a scheme for calculating a target Pls is employed. That is, in this embodiment, the speed is calculated based on the number of edges (corresponding to the immediately previous operation speed of the range ring) which is detected in the immediately previous cycle processing time, and a constant speed drive is attempted to be performed at the calculated speed in the next cycle-processing time. Therefore, the processing is completed reflecting on the driving speed for each cycle processing, so that the focus (FCS) driving corresponding to a change in the operation of a user is enabled without dependent on the past operation state.

In the conventional manual focus control, because a control is made so as to drive the calculated number of Pls in the shortest time, the image plane speed in the cycle processing time is changed by acceleration/deceleration control etc. However, in this embodiment, the constant speed drive is performed within the cycle processing time, so that the change in the image plane speed within the cycle processing time becomes constant to improve the appearance of a subject image during manual focusing.

Figure 13:
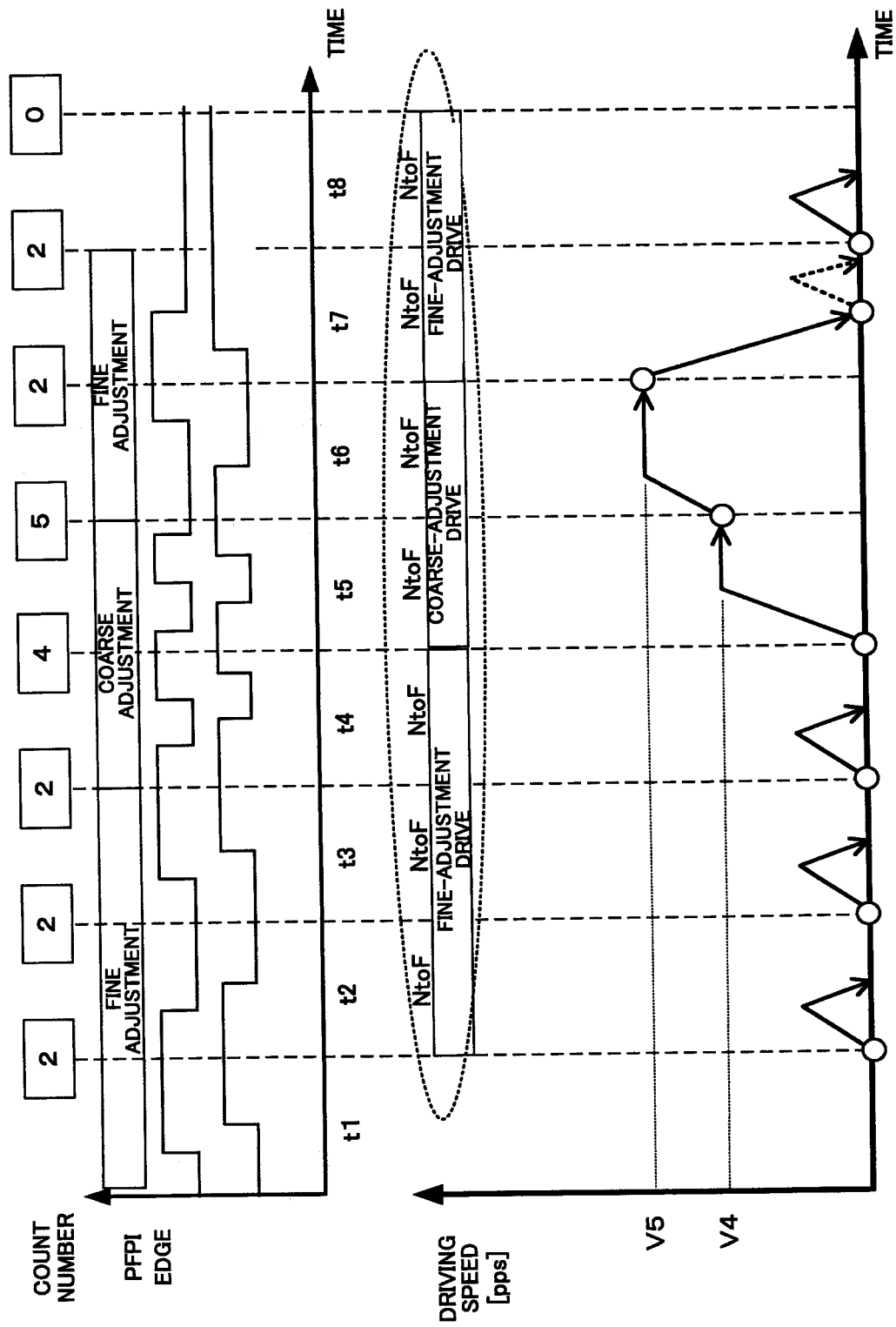
FIG. 13 is a timing chart illustrating the outline of manual focusing control in a camera according to a modification of an embodiment of the present invention.

Next, a modification of an embodiment of the present invention will be explained using FIG. 13 and FIG. 14. In an embodiment, for both the fine adjustment and the coarse adjustment, constant speed drive is performed. On the other hand, in this modification, for the fine adjustment, the Pls drive corresponding to a predetermined image plane movement amount (conversion value of the permissible circle of confusion) is performed, while for the coarse adjustment, a constant speed drive is performed. Because the configuration of this modification is the same as that of an embodiment of the present invention illustrated in FIG. 1 and FIG. 2, the detailed description will be omitted.

The control in this modification will be explained using FIG. 13. FIG. 13 illustrates the operation of this modification using the form of an operation diagram of an embodiment of the present invention illustrated in FIG. 4. In an embodiment of the present invention, the constant speed drive at the speed V2 is set at the end time point of the cycle t1, while in this modification the number of Pls calculated in the cycle t1 is driven within the shortest time.

Hereinafter, also at the end time points in the cycles t2, t3, similarly the number of Pls calculated in the immediately previous cycle is driven within the shortest time. When the focusing lens cannot finish moving with the fine-adjustment drive within the cycle processing time and the fine-adjustment drive changes to the coarse-adjustment drive, target change processing is performed. In the example illustrated in FIG. 13, the movement of the focusing lens is completed by the fine-adjustment operation within the cycle processing time of the cycle t4. When the movement of the focusing lens is not completed within the processing time of the cycle t4, the coarse-adjustment drive of the cycle t5 will continue by changing the target position.

Because the counted number of input edges increases from 2 to 4 at the end time point of the cycle t4, adjustment drive becomes the coarse-adjustment drive at a cycle processing update timing which is the end time point of the cycle t4, and acceleration/deceleration drive is performed at the target driving speed V4 toward the infinite direction. Subsequently, at the end time point of the cycle t5, the coarse-adjustment drive speed is changed to V5 to perform the acceleration/deceleration drive.

At the end time point of the cycle t6, because the counted number of input edges decreases from 5 to 2, the adjustment drive becomes the fine-adjustment drive. When the adjustment drive becomes the fine adjustment from the coarse adjustment, the target position of the fine adjustment may be passed, and in this case the target position may be passed by 1Fδ or more. Return processing may be performed, but in this case, in observing a live view image, a change in the image is visible to produce a sense of discomfort. Then, when the adjustment is changed from the coarse adjustment to the fine adjustment, only stop control is performed. The fine-adjustment control when the operation changes from the coarse-adjustment operation to fine-adjustment operation is performed when a user stops the operation of the range ring 51, and this is therefore the case where a user stops the focusing lens and thus a sense of discomfort will not occur.

In the cycle t7, because the number of PFPI input edges of this period is two, fine-adjustment drive is performed. Because the adjustment drive changes to the fine-adjustment drive in the cycle t6, which is continuously operated also in the cycle t7, the fine-adjustment drive is similarly performed.

In FIG. 5A illustrating the calculation processing in fine-adjustment drive according to an embodiment of the present invention, just F301 to F309 may be used and F311 to F315, F327, and F329 may be omitted in this modification, so the detailed explanation will be omitted.

Next, the operation of this modification will be explained using the flowchart illustrated in FIG. 14. The manual focus driving flow illustrated in FIG. 10 and FIG. 11 according to an embodiment of the present invention is the same also in this modification. For the operation in this modification, the flowchart illustrated in FIG. 12 according to an embodiment is just replaced with the flow of FIG. 14. Moreover, the flowchart illustrated in FIG. 14 differs from the flowchart of FIG. 12 in that step S63 is omitted and step S65 is added. Then, this difference will be focused and explained.

Once the focus drive amount calculation flow illustrated in FIG. 14 is started, then in step S51 it is determined whether or not the number of detected edges is equal to or greater than the limit number of edges. When the number of detected edges is the limit number of edges as the result of this determination, the driving speed of coarse-adjustment control is calculated in step S59 and the subsequent steps. In steps S59, S61, an area division is selected, and the number of drive pulses is selected with reference to the coarse-adjustment drive Pls table from this selected area division and the current focusing length.

Once the number of drive pulses is selected, then the driving speed is calculated (S65). Here, the driving speed is calculated by dividing the driving Pls by the cycle processing time. Based on the calculated driving speed, the focusing-lens driving is performed at a constant speed as with an embodiment of the present invention (see S35, S37 of FIG. 11).

On the other hand, when the number of detected edges is not equal to nor greater than the limit number of input edges as the result of determination in step S51, the number of drive pulses for fine-adjustment control will be calculated in step S53 and the subsequent steps. The conversion value of the permissible circle of confusion (Defμm) is selected in step S53, the open Fno and Fc sensitivity based on the current focusing length are selected in step S55, and then the number of drive pulses Pls is calculated from the conversion value of the permissible circle of confusion (Defμm). Based on the calculated number of drive pulses Pls, the Pls drive explained using FIG. 13 is performed (see S35, S37 of FIG. 11).

Once the number of driving Pls or driving speed is calculated in steps S57, S65, the flow returns to the original flow to perform focusing-lens driving.

Also in this modification, manual focus control (MF control) is performed in the next cycle processing after counting the number of input edges. In the case of the coarse adjustment, the constant speed drive is performed. In this case, the control is made so as to perform the constant speed drive in the whole cycle processing time (except acceleration/deceleration time). Moreover, in the case of the fine adjustment, Pls drive is performed in this modification. As in this modification, Pls drive instead of the constant speed drive would be completed faster for fine adjustment, resulting in an improvement in response.

As explained above, in an embodiment and/or modification of the present invention, a shooting apparatus includes: a focusing lens (e.g., see the focusing lens 11b and the like) provided within the lens barrel including a shooting lens, the focusing lens being movable in an optical axis direction; a ring member (e.g., see the range ring 51 and the like) which is arranged to be rotatable with respect to the lens barrel. Then, in this embodiment, the rotation amount and rotation direction of the ring member are detected (e.g., see F301 of FIG. 5A, F331 of FIG. 6A, S27 of FIG. 11, etc.), the moving speed of the focusing lens is calculated based on the detected rotation amount (e.g., see F315 of FIG. 5A, F339 of FIG. 6A, S63 of FIG. 12, etc.), and movement of the focusing lens is controlled in accordance with the rotation direction at the moving speed calculated in a predetermined cycle period (e.g., see S35, S37, etc. of FIG. 11). Therefore, the control can be made so as to smoothly switch between coarse-adjustment drive and fine-adjustment drive.

Note that, an example suitable for a zoom lens has been explained in an embodiment and modification of the present invention. The present invention aims to smoothly switch between coarse-adjustment drive and fine-adjustment drive, respond to a change in a user operation, and obtain a targeted operational feeling, but these effects can be achieved even in a case where the present invention is applied to a single focusing lens.

Moreover, although both the fine-adjustment control and the coarse-adjustment control are performed in an embodiment and/or modification of the present invention, the present invention may be applied only to either one of the fine-adjustment control and coarse-adjustment control while a control similar to the conventional one may be performed on the other one.

Moreover, the controller is realized by the CPU 41 in an embodiment and/or modification of the present invention, but other than the CPU or in addition to the CPU, the controller may be implemented by hardware configuration, such as a gate circuit, which is generated based on a programming language described in Verilog, or may be implemented by using a hardware configuration utilizing software of a DSP(Digital Signal Processor) or the like. These may be certainly combined as needed.

Moreover, in an embodiment and/or modification of the present invention, a digital camera has been used and explained as the shooting apparatus, but a digital single lens reflex camera, a mirrorless camera, or a compact digital camera may be used, or a camera for a moving image, such as a video camera or a movie camera, may be used, and further a camera incorporated into a mobile phone, a smartphone, a mobile information terminal, a personal computer (PC), a tablet computer, a game console or the like, a medical camera, a camera for a scientific instrument such as a microscope, a camera mounted on an automotive, or a monitor camera may be used as the camera. In either case, the present invention is applicable to any apparatus for the purpose of shooting by a manual rotational-operation.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A shooting apparatus, comprising:
  a focusing lens provided within a lens barrel including a shooting lens, the focusing lens being movable in an optical axis direction;
  a ring disposed so as to be rotatable with respect to the lens barrel;
  a rotation detector configured to detect a rotation amount and rotation direction of the ring in a predetermined cycle period;
  a rotation speed detector configured to detect a rotation speed of the ring in the predetermined cycle period;
  a memory for storing a first relationship between a rotation amount of the ring and an image plane movement amount and a second relationship between a rotation amount of the ring and a movement amount of the focusing lens; and
  a controller configured to execute a program of stored instructions to
    (1) calculate, based on the rotation amount detected by the rotation detector and the rotation speed detected by the rotation speed detector, a moving speed of the focusing lens to control a movement of the focusing lens at the moving speed calculated in the predetermined cycle period and in accordance with the rotation direction,
    (2) responsive to a determination that a rotation speed that has been detected by the rotation speed detector is smaller than a predetermined value,
      calculates a movement amount of the focusing lens, constituting specified image plane movement amount with respect to the rotation amount of the ring, based on the first relationship, and
      sets moving speed for the focus adjustment lens based on the movement amount that has been calculated, and the period, and
    otherwise, responsive to a determination that the rotation speed is larger than the predetermined value,
      calculates a movement amount based on a maximum value that can be set for movement amount based on the first relationship in a case where the rotation speed is smaller than the predetermined value, a maximum value that can be set for movement amount based on the second relationship in a case where the rotation speed is larger than the predetermined value, and the rotation amount, and
      sets a moving speed for the focusing lens based on the movement amount that has been calculated, and the predetermined cycle period.

2. The shooting apparatus according to claim 1, wherein the rotation detector detects a rotation amount and rotation direction of the ring for each of the predetermined cycle periods.

3. A focusing method in a shooting apparatus including: a focusing lens provided within a lens barrel including a shooting lens, the focusing lens being movable in an optical axis direction; and a ring disposed so as to be rotatable with respect to the lens barrel, the focusing method comprising:
  detecting a rotation amount and rotation direction of the ring in a predetermined cycle period;
  detecting a rotation speed of the ring in the predetermined cycle period;
  storing a first relationship between a rotation amount of the ring and an image plane movement amount and a second relationship between a rotation amount of the ring and a movement amount of the focusing lens;
  calculating a moving speed of the focusing lens based on the rotation amount detected and the rotation speed detected to control a movement of the focusing lens in accordance with the rotation direction at the calculated moving speed in the predetermined cycle period; and
  responsive to a determination that a rotation speed that has been detected is smaller than a predetermined value, calculating a movement amount of the focusing lens, constituting specified image plane movement amount with respect to the rotation amount of the ring, based on the first relationship, and setting moving speed for the focus adjustment lens based on the movement amount that has been calculated, and the period, and otherwise, responsive to a determination that the rotation speed is larger than the predetermined value, calculating a movement amount based on a maximum value that can be set for movement amount based on the first relationship in a case where the rotation speed is smaller than the predetermined value, a maximum value that can be set for movement amount based on the second relationship in a case where the rotation speed is larger than the predetermined value, and the rotation amount, and setting a moving speed for the focusing lens based on the movement amount that has been calculated, and the predetermined cycle period.

4. The shooting method according to claim 3, wherein the rotation amount and rotation direction of the ring are detected for each of the predetermined cycle periods.

5. A non-transitory computer-readable medium storing a processor executable code, which when executed by at least one processor, the processor being provided in a shooting apparatus including a focusing lens provided within a lens barrel including a shooting lens, the focusing lens being movable in an optical axis direction and a ring disposed so as to be rotatable with respect to the lens barrel, causes the processor to perform a shooting method, the shooting method comprising:

detecting a rotation amount and rotation direction of the ring in a predetermined cycle period;

detecting a rotation speed of the ring in the predetermined cycle period;

storing a first relationship between a rotation amount of the ring and an image plane movement amount and a second relationship between a rotation amount of the ring and a movement amount of the focusing lens;

calculating a moving speed of the focusing lens based on the rotation amount detected and the rotation speed detected to control a movement of the focusing lens in accordance with the rotation direction at the calculated moving speed in the predetermined cycle period; and responsive to a determination that a rotation speed that has been detected is smaller than a predetermined value, calculating a movement amount of the focusing lens, constituting specified image plane movement amount with respect to the rotation amount of the ring, based on the first relationship, and setting moving speed for the focus adjustment lens based on the movement amount that has been calculated, and the period, and otherwise, responsive to a determination that the rotation speed is larger than the predetermined value, calculating a movement amount based on a maximum value that can be set for movement amount based on the first relationship in a case where the rotation speed is smaller than the predetermined value, a maximum value that can be set for movement amount based on the second relationship in a case where the rotation speed is larger than the predetermined value, and the rotation amount, and setting a moving speed for the focusing lens based on the movement amount that has been calculated, and the predetermined cycle period.

6. The non-transitory computer-readable medium according to claim 5, the shooting method comprising:

detecting the rotation amount and rotation direction of the ring for each of the predetermined cycle periods.

7. The shooting apparatus of claim 1, wherein:

the controller, when the rotation speed is larger than the predetermined value, generates a relationship between rotation speed and movement amount based on movement amount based on a maximum value that can be set for movement amount in a case where the rotation speed based on the first relationship is smaller than a predetermined value, and a maximum value that can be set for movement amount in a case where the rotation speed based on the second relationship is larger than a specified value, and calculates movement amount based on the relationship that has been generated and the rotation speed.

8. The shooting apparatus of claim 7, wherein:

the memory stores a correction coefficient in accordance with the rotation speed; and the controller corrects the relationship that has been generated, based on the correction coefficient.

9. The shooting apparatus of claim 1, wherein:

the lens barrel includes a mechanism for changing focal length of the shooting lens;

the memory stores a plurality of first relationships and a plurality of second relationships in accordance with the focal length; and the controller selects the first relationship and the second relationship in accordance with detecting the focal length.

* * * * *